(12) United States Patent
Ito et al.

(10) Patent No.: US 8,494,984 B2
(45) Date of Patent: Jul. 23, 2013

(54) INFORMATION PROCESSING DEVICE, INFORMATION PROCESSING METHOD, AND PROGRAM

(75) Inventors: Masato Ito, Tokyo (JP); Hirotaka Suzuki, Kanagawa (JP); Naoki Ide, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 12/954,381

(22) Filed: Nov. 24, 2010

(65) Prior Publication Data

US 2011/0137835 A1 Jun. 9, 2011

(30) Foreign Application Priority Data

Dec. 4, 2009 (JP) ................ P2009-276913

(51) Int. Cl.
*G06F 15/18* (2006.01)
(52) U.S. Cl.
USPC ............................................. 706/12; 725/56
(58) Field of Classification Search
USPC ............................................. 706/12; 725/58
See application file for complete search history.

(56) References Cited

U.S. PATENT DOCUMENTS

| | | | |
|---|---|---|---|
| 7,437,751 B2 * | 10/2008 | Daniels | 725/112 |
| 7,698,236 B2 * | 4/2010 | Cox et al. | 706/12 |
| 8,090,670 B2 * | 1/2012 | Sridhar et al. | 706/45 |
| 8,397,263 B2 * | 3/2013 | Takagi | 725/58 |
| 2011/0060709 A1 * | 3/2011 | Ide et al. | 706/12 |
| 2011/0313956 A1 * | 12/2011 | Abe et al. | 706/12 |

FOREIGN PATENT DOCUMENTS

| | | |
|---|---|---|
| JP | 2005-57713 | 3/2005 |
| JP | 2006-524009 | 10/2006 |
| JP | 2009-141952 | 6/2009 |
| JP | 2009-147904 | 7/2009 |

* cited by examiner

*Primary Examiner* — Jeffrey A Gaffin
*Assistant Examiner* — Ola Olude Afolabi
(74) *Attorney, Agent, or Firm* — Finnegan, Henderson, Farabow, Garrett & Dunner, L.L.P.

(57) ABSTRACT

An information processing device includes an acquisition unit acquiring a viewing log including information representing content of an operation for viewing content and time of the operation, a learning unit learning, based on the viewing log acquired by the acquisition unit, a viewing behavior model which is a stochastic state transition model representing a viewing behavior of a user, a recognition unit recognizing, using the viewing behavior model obtained through learning by the learning unit, a current viewing state of the user, a prediction unit predicting, using the viewing behavior model, the viewing behavior of the user after a predetermined period of time with the current viewing state of the user recognized by the recognition unit as a starting point, and a display control unit displaying information relating to content predicted to be viewed through the viewing behavior predicted by the prediction unit.

12 Claims, 17 Drawing Sheets

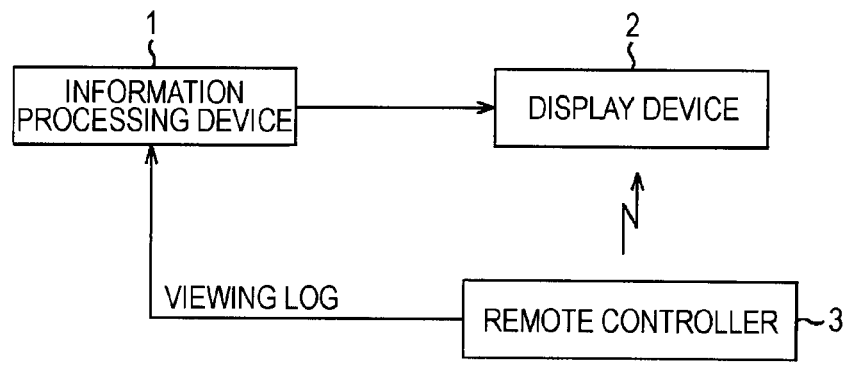
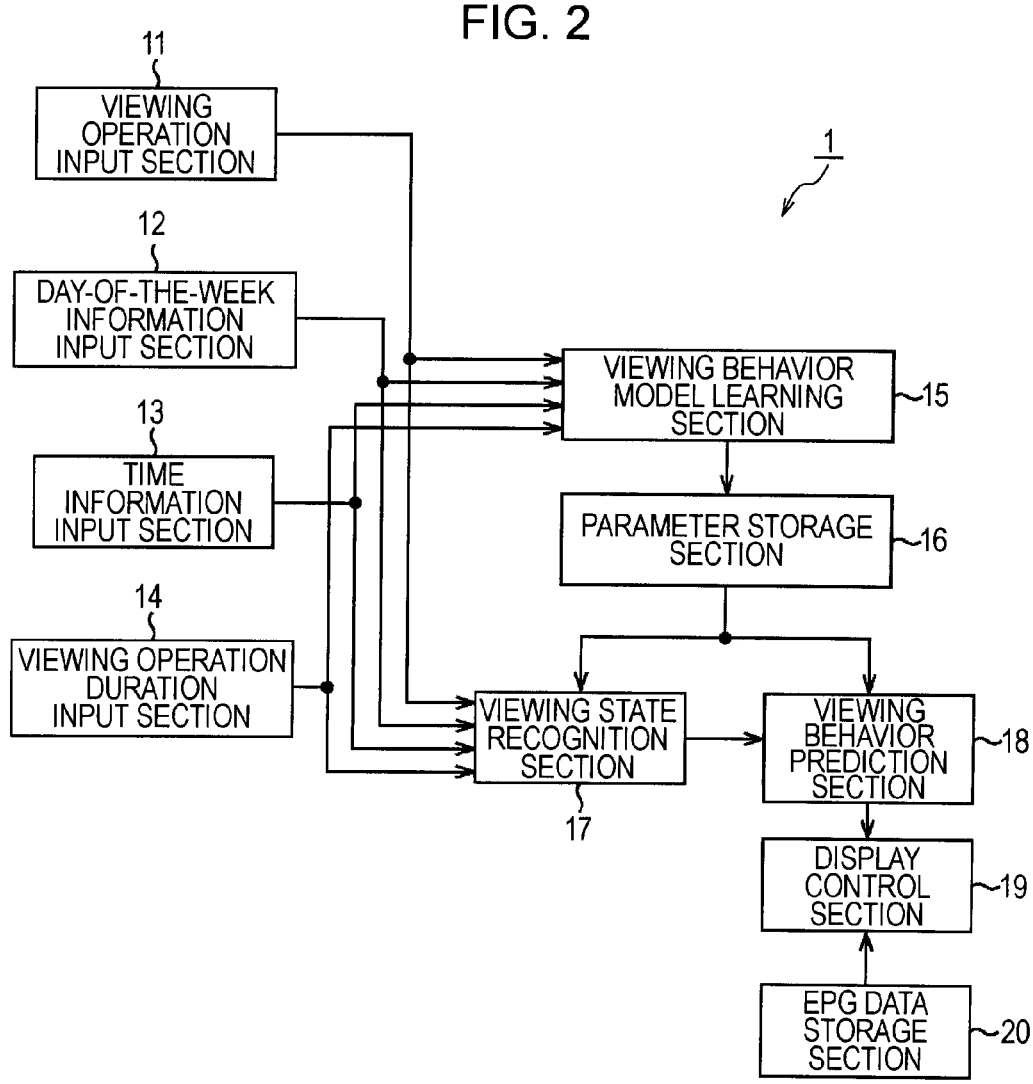

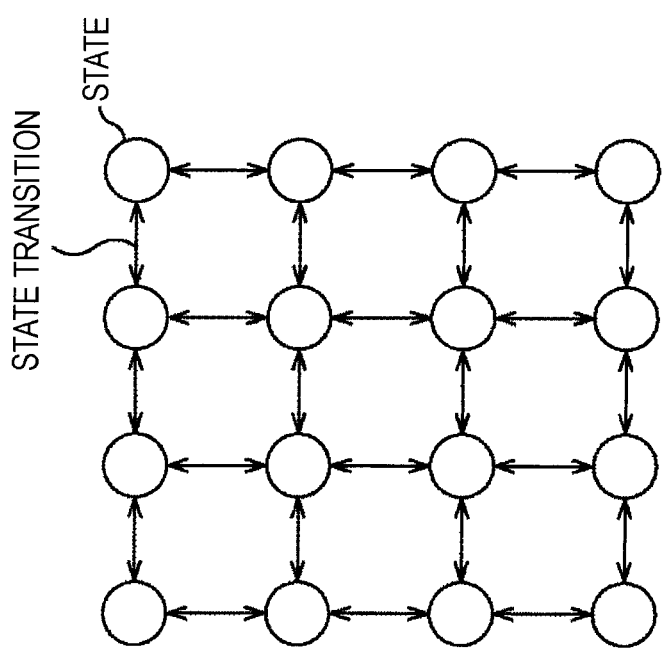
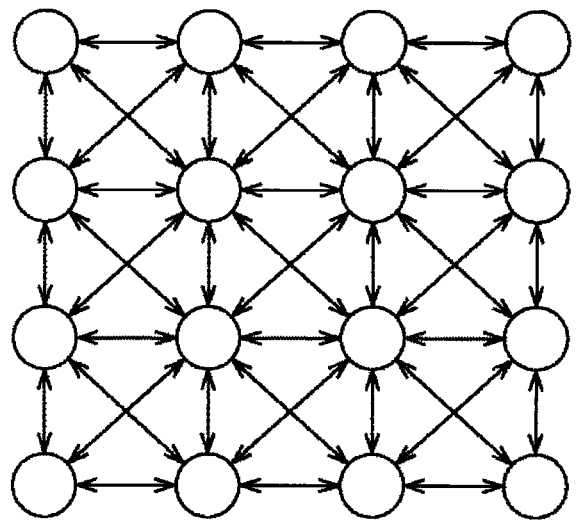
FIG. 7A
FIG. 7B

FIG. 10

| DATE | DAY OF THE WEEK | TIME | VIEWING OPERATION |
|---|---|---|---|
| NOV. 21 | SAT. | 10:55 | CHANNEL 1 |
| NOV. 21 | SAT. | 11:30 | CHANNEL 4 |
| NOV. 21 | SAT. | 13:00 | CHANNEL 6 |
| NOV. 21 | SAT. | 13:50 | POWER OFF |
| NOV. 21 | SAT. | 20:00 | CHANNEL 10 |
| NOV. 21 | SAT. | 21:00 | VIDEO |
| NOV. 21 | SAT. | 22:00 | POWER OFF |
| NOV. 21 | SUN. | 12:00 | CHANNEL 8 |
| NOV. 21 | SUN. | 13:00 | CHANNEL 6 |
| ⋮ | ⋮ | ⋮ | ⋮ |

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program, and particularly relates to an information processing device, an information processing method, and a program whereby a viewing behavior model with chronological consideration can be learned from a viewing log representing content of a viewing operation of a user to predict a viewing behavior.

2. Description of the Related Art

Various techniques of predicting a viewing behavior of a user with respect to content such as a television program have been disclosed.

For example, a method is disclosed in which a viewing behavior of a user is predicted using a model of user preference profile or viewing content (see Japanese Unexamined Patent Application Publication No. 2005-57713 or Japanese Unexamined Patent Application Publication No. 2009-141952). Also, as a method of predicting a viewing behavior of a user using a viewing log, a method is disclosed in which a day of the week and time of a viewing operation is modeled using frequency, a neural network, a Bayesian network, or the like (see Japanese Unexamined Patent Application Publication No. 2006-524009 or Japanese Unexamined Patent Application Publication No. 2009-147904).

SUMMARY OF THE INVENTION

Predicting a viewing behavior using the method described in Japanese Unexamined Patent Application Publication No. 2005-57713 or Japanese Unexamined Patent Application Publication No. 2009-141952 obviously relies on creating a model of user preference profile or viewing content.

Also, in the method described in Japanese Unexamined Patent Application Publication No. 2006-524009 or Japanese Unexamined Patent Application Publication No. 2009-147904, a pattern in viewing behavior of a user over time, such as particular content being viewed after particular content, is not modeled.

Thus, it is desirable to enable learning of a viewing behavior model with chronological consideration from a viewing log representing content of a viewing operation of a user to predict a viewing behavior.

An information processing device according to an embodiment of the present invention includes acquisition means for acquiring a viewing log including information representing content of an operation for viewing content and time of the operation, learning means for learning, based on the viewing log acquired by the acquisition means, a viewing behavior model which is a stochastic state transition model representing a viewing behavior of a user, recognition means for recognizing, using the viewing behavior model obtained through learning by the learning means, a current viewing state of the user, prediction means for predicting, using the viewing behavior model, the viewing behavior of the user after a predetermined period of time with the current viewing state of the user recognized by the recognition means as a starting point, and display control means for displaying information relating to content predicted to be viewed through the viewing behavior predicted by the prediction means.

The prediction means may predict the viewing behavior of the user after the predetermined period of time as an occurrence probability.

The prediction means may predict the viewing behavior of the user after the predetermined period of time by assuming that an observation probability of each state at each point in time is an equal probability in the viewing behavior model and calculating the occurrence probability of each state after the predetermined period of time based on a state transition probability of the viewing behavior model.

The prediction means may predict the viewing behavior of the user after the predetermined period of time by calculating the occurrence probability of each state within the predetermined period of time in the viewing behavior model which is determined experientially using a random number based on a state transition probability of the viewing behavior model.

The prediction means may predict, as the viewing behavior of the user after the predetermined period of time, the viewing behavior of which the occurrence probability after the predetermined period of time is maximum or the viewing behavior of which the occurrence probability after the predetermined period of time is greater than or equal to a predetermined threshold value.

The viewing behavior model may be a hidden Markov model which is the stochastic state transition model including a hidden state and applied with a sparsity constraint.

The viewing behavior model may be a multistream hidden Markov model applied with a sparsity constraint.

The information processing device may further include control means for controlling the prediction means to not perform prediction using the viewing behavior model when a likelihood calculated by the learning means at a time of learning of the viewing behavior model is lower than a threshold value or when a value of an entropy of the viewing behavior model is higher than a threshold value.

The information processing device may further include control means for controlling the prediction means to not perform prediction with the current viewing state of the user recognized by the recognition means as the starting point when a likelihood obtained at a time of recognition of the current viewing state of the user by the recognition means is lower than a threshold value.

An information processing method according to another embodiment of the present invention includes the steps of acquiring a viewing log including information representing content of an operation for viewing content and time of the operation, learning, based on the acquired viewing log, a viewing behavior model which is a stochastic state transition model representing a viewing behavior of a user, recognizing, using the viewing behavior model obtained through learning, a current viewing state of the user, predicting, using the viewing behavior model, the viewing behavior of the user after a predetermined period of time with the recognized current viewing state of the user as a starting point, and displaying information relating to content predicted to be viewed through the predicted viewing behavior.

A program according to still another embodiment of the present invention causes a computer to execute a process including the steps of acquiring a viewing log including information representing content of an operation for viewing content and time of the operation, learning, based on the acquired viewing log, a viewing behavior model which is a stochastic state transition model representing a viewing behavior of a user, recognizing, using the viewing behavior model obtained through learning, a current viewing state of the user, predicting, using the viewing behavior model, the viewing behavior of the user after a predetermined period of time with the recognized current viewing state of the user as a starting point, and displaying information relating to content predicted to be viewed through the predicted viewing behavior.

According to yet another embodiment of the present invention, a viewing log including information representing content of an operation for viewing content and time of the operation is acquired, and a viewing behavior model which is a stochastic state transition model representing a viewing behavior of a user is learned based on the acquired viewing log. Also, a current viewing state of the user is recognized using the viewing behavior model obtained through learning, and the viewing behavior of the user after a predetermined period of time is predicted using the viewing behavior model with the recognized current viewing state of the user as a starting point. Further, information relating to content predicted to be viewed through the predicted viewing behavior is displayed.

According to the embodiments of the present invention, a viewing behavior model with chronological consideration can be learned from a viewing log representing content of a viewing operation of a user to predict a viewing behavior.

BRIEF DESCRIPTION OF THE DRAWINGS

FIG. 1 is a block diagram showing a configuration example of an information processing system according to an embodiment of the present invention;

FIG. 2 is a block diagram showing a configuration example of an information processing device;

FIGS. 7A and 7B illustrate an HMM applied with a sparsity constraint;

FIG. 10 illustrates an example of a viewing log;

DESCRIPTION OF THE PREFERRED EMBODIMENTS

Figure 3:
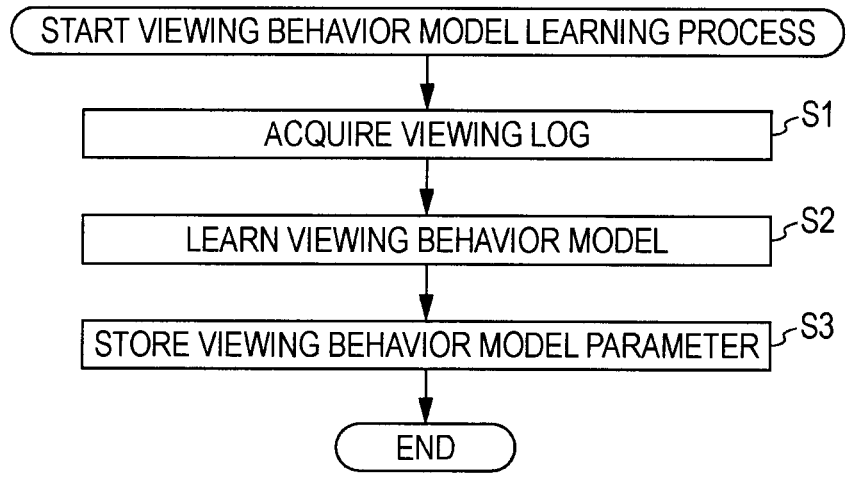
FIG. 3 is a flowchart illustrating a viewing behavior model learning process.

[Configuration Example of an Information Processing System]

FIG. 1 is a block diagram showing a configuration example of an information processing system according to an embodiment of the present invention.

The information processing system in FIG. 1 includes an information processing device 1, a display device 2, and a remote controller 3. The display device 2 is a television receiver including a display section such as a liquid crystal display (LCD) and is connected with the information processing device 1 by a High-Definition Multimedia Interface (HDMI) cable or the like.

The remote controller 3 is a controller used by a user to operate the display device 2. The remote controller 3 is provided with a button operated to turn the power on or off, a button operated to select a channel, and the like.

The remote controller 3 generates a viewing log every time the user performs a viewing operation, such as a channel-selecting operation, which is an operation for viewing a program (television program) using the display device 2. The viewing log includes information representing content of the viewing operation and information of date, time, and day of the week of the performed viewing operation.

The remote controller 3 sends the generated viewing log to the information processing device 1 through wired communication performed via a universal serial bus (USB) or the like or through wireless communication such as Bluetooth™ communication. The viewing log generated by the remote controller 3 includes the information of date and time and is time series data which can be arranged in chronological order.

The information processing device 1 receives the viewing log which is the time series data sent from the remote controller 3 and learns the viewing behavior of the user as a stochastic state transition model based on the received viewing log. A viewing behavior model, i.e., the stochastic state transition model in which the viewing behavior of the user is modeled, is learned using the viewing log stored within a predetermined period such as, for example, 3 months.

As the viewing behavior model, the stochastic state transition model including a hidden state, such as a multistream ergodic hidden Markov model (HMM), may be employed. The multistream ergodic HMM will be described later.

When the user performs a predetermined viewing operation after the viewing behavior model is learned and the viewing log is sent from the remote controller 3, the information processing device 1 recognizes a current viewing state of the user using the viewing behavior model.

By predicting an occurrence probability of each state up to predetermined time in the future using the viewing behavior model with the current viewing state of the user as the starting point, the information processing device 1 predicts the viewing behavior of the user at the predetermined time. For example, a number of a channel to be selected by the user at the predetermined in the future is predicted as the viewing behavior of the user.

After predicting the viewing behavior, the information processing device 1 refers to electronic program guide (EPG) data stored in an internal memory or the like to specify a program to be broadcast on the channel which is predicted to be selected by the user. The information processing device 1 extracts information, such as a program name, information on casting, or a feature image, relating to the specified program from the EPG data and causes the display device 2 to display the information before the broadcast of the program starts.

Accordingly, the information processing device 1 can predict the viewing behavior from the viewing log of the user without using a model of user preference profile or viewing content to enable presentation of the information relating to the program predicted to be viewed.

Also, by predicting the viewing behavior of the user using the stochastic state transition model, it is possible to select a program in consideration of a viewing pattern of the user over time. For example, assume a case of a viewing pattern in which a program broadcast on channel 4 at 7:00 in the morning on Monday is viewed and then a program broadcast on channel 8 at 9:00 in the morning is viewed and a viewing pattern in which a program broadcast on channel 1 at 8:00 in the morning on Monday is viewed and then a program broadcast on channel 10 at 10:00 in the morning is viewed. When a program is selected simply based on a history of the viewing operation, programs broadcast on channel 4 at 7:00 in the morning, channel 1 at 8:00 in the morning, channel 8 at 9:00 in the morning, and channel 10 at 10:00 in the morning are selected in chronological order. However, in this case, it is possible to select the program broadcast on channel 8 at 9:00 in the morning when the program broadcast on channel 4 at 7:00 in the morning is viewed and to select the program broadcast on channel 10 at 10:00 in the morning when the program broadcast on channel 1 at 8:00 in the morning is viewed.

[Configuration Example of the Information Processing Device] 1

FIG. 2 is a block diagram showing a configuration example of the information processing device 1.

The viewing log sent from the remote controller 3 is input to a viewing operation input section 11, a day-of-the-week information input section 12, a time information input section 13, and a viewing operation duration input section 14.

The viewing operation input section 11 extracts the information representing the content of the viewing operation from the viewing log and outputs an operation ID. The viewing operation input section 11 manages information associating the viewing operation, such as an operation of turning the power of the display device 2 on or off or the channel-selecting operation of each channel, and the operation ID. Based on the managed information, the viewing operation input section 11 selects and outputs the operation ID corresponding to the content of the viewing operation represented by the information extracted from the viewing log. The operation ID output from the viewing operation input section 11 is supplied to a viewing behavior model learning section 15 at the time of learning of the viewing behavior model and is supplied to a viewing state recognition section 17 at the time of prediction of the viewing behavior.

The day-of-the-week information input section 12 extracts the information of the day of the week on which the viewing operation is performed from the viewing log and outputs the information. It may be such that the day-of-the-week information input section 12 specifies the day of the week on which the viewing operation is performed based on the information of the date and time at which the viewing operation is performed and outputs information of the specified day of the week, when the viewing log does not include the information of the day of the week. The information of the day of the week output from the day-of-the-week information input section 12 is supplied to the viewing behavior model learning section 15 at the time of learning of the viewing behavior model and is supplied to the viewing state recognition section 17 at the time of prediction of the viewing behavior.

The time information input section 13 extracts the information of the time at which the viewing operation is performed from the viewing log and outputs the information. The information of the time output from the time information input section 13 is supplied to the viewing behavior model learning section 15 at the time of learning of the viewing behavior model and is supplied to the viewing state recognition section 17 at the time of prediction of the viewing behavior.

The viewing operation duration input section 14 calculates a viewing operation duration, which is a duration of the viewing operation represented by a difference between time included in the received viewing log and time included in the viewing log last received, and outputs information of the viewing operation duration. The information of the viewing operation duration output from the viewing operation duration input section 14 is supplied to the viewing behavior model learning section 15 at the time of learning of the viewing behavior model and is supplied to the viewing state recognition section 17 at the time of prediction of the viewing behavior.

In this manner, the viewing operation input section 11, the day-of-the-week information input section 12, the time information input section 13, and the viewing operation duration input section 14 acquires the viewing log of the user and outputs the respective pieces of information as time series data. The information output from the viewing operation input section 11 is the time series data of the operation ID, and the information output from the day-of-the-week information input section 12 is the time series data of the day of the week. The information output from the time information input section 13 is the time series data of the time, and the information output from the viewing operation duration input section 14 is the time series data of the viewing operation duration.

The viewing behavior model learning section 15 learns the viewing behavior model based on the time series data (stream) supplied from the viewing operation input section 11, the day-of-the-week information input section 12, the time information input section 13, and the viewing operation duration input section 14. In this embodiment, the multi-stream ergodic HMM applied with a scarcity constraint is employed as the viewing behavior model. The viewing behavior model learning section 15 stores a parameter of the viewing behavior model obtained through learning in a parameter storage section 16.

Note that it is also possible to perform the learning of the viewing behavior model using three types of the time series data, i.e., the operation ID, the information of the day of the week, and the information of the time, out of four types of the time series data, i.e., the operation ID, the information of the day of the week, the information of the time, and the information of the viewing operation duration.

When the user performs the viewing operation after the learning of the viewing behavior model and the time series data is supplied from the viewing operation input section 11, the day-of-the-week information input section 12, the time information input section 13, and the viewing operation duration input section 14, the viewing state recognition section 17 receives the time series data. The viewing state recognition section 17 recognizes the viewing state which is the current viewing behavior of the user based on the viewing behavior model and outputs a state ID representing the viewing state to a viewing behavior prediction section 18.

The viewing behavior prediction section 18 predicts the viewing behavior of the user after a predetermined period of time based on the viewing behavior model.

Specifically, with the starting point being the viewing state of the user at current time T (T>0) represented by the state ID supplied from the viewing state recognition section 17, the viewing behavior prediction section 18 determines the viewing behavior of which the occurrence probability in an N-th viewing operation step (N>0) from the time T is maximum as a prediction result. The viewing behavior of which the occurrence probability is greater than or equal to a predetermined threshold value in the N-th viewing operation step (N>0) from the time T may be determined as the prediction result. The viewing behavior prediction section 18 outputs the state ID representing the predicted viewing behavior to a display control section 19.

When the viewing behavior represented by the state ID supplied from the viewing behavior prediction section 18 is a behavior of selecting a channel, the display control section 19 refers to the EPG data stored in an EPG data storage section 20 to specify the program predicted to be viewed upon selection of the channel. The display control section 19 acquires information relating to the specified program predicted to be viewed from the EPG data and causes the display device 2 to display the information.

The EPG data storage section 20 receives the EPG data sent from a distribution device via broadcast waves or via a network such as the Internet and stores the EPG data.

[Operation of the Information Processing Device 1]

A viewing behavior model learning process of the information processing device 1 is described with reference to a flowchart in FIG. 3.

In step S1, the viewing operation input section 11, the day-of-the-week information input section 12, the time information input section 13, and the viewing operation duration input section 14 each acquires the viewing log sent from the remote controller 3. The viewing operation input section 11, the day-of-the-week information input section 12, the time information input section 13, and the viewing operation duration input section 14 each outputs the time series data described above to the viewing behavior model learning section 15.

In step S2, the viewing behavior model learning section 15 learns the viewing behavior model based on the time series data supplied from the viewing operation input section 11, the day-of-the-week information input section 12, the time information input section 13, and the viewing operation duration input section 14. That is, the viewing behavior model learning section 15 calculates the parameter of the stochastic state transition model as the viewing behavior model.

In step S3, the parameter storage section 16 stores the parameter of the viewing behavior model calculated through learning by the viewing behavior model learning section 15. Then, the process is terminated.

Figure 4:
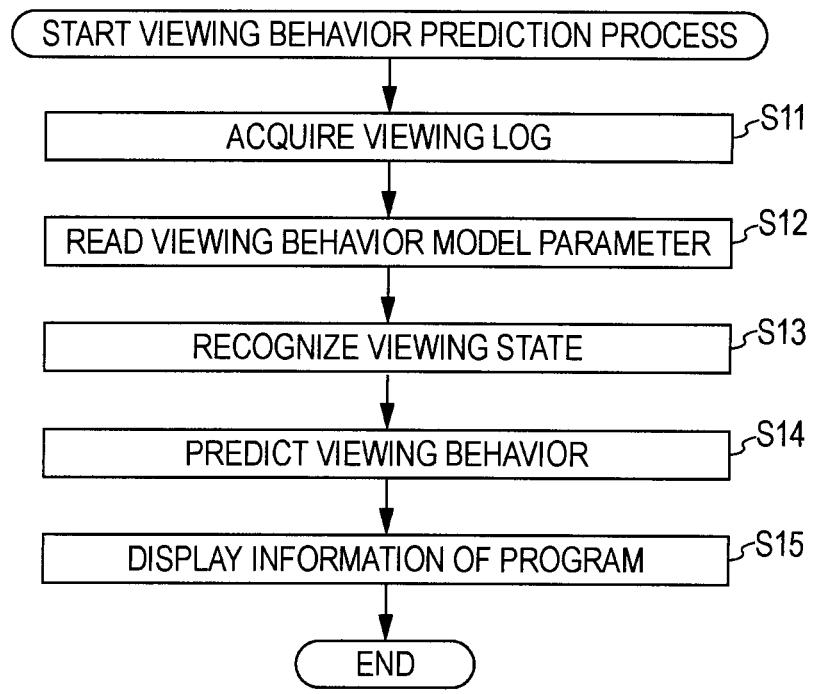
FIG. 4 is a flowchart illustrating a viewing behavior prediction process.

Next, a viewing behavior prediction process of the information processing device 1 is described with reference to a flowchart in FIG. 4.

This process starts when a predetermined viewing operation is performed by the user and a new viewing log is sent from the remote controller 3 in a state where the parameter of the viewing behavior model is stored in the parameter storage section 16.

In step S11, the viewing operation input section 11, the day-of-the-week information input section 12, the time information input section 13, and the viewing operation duration input section 14 each acquires the viewing log sent from the remote controller 3. The viewing operation input section 11, the day-of-the-week information input section 12, the time information input section 13, and the viewing operation duration input section 14 each outputs the time series data to the viewing state recognition section 17.

In step S12, the viewing state recognition section 17 and the viewing behavior prediction section 18 read the parameter of the viewing behavior model from the parameter storage section 16.

In step S13, the viewing state recognition section 17 recognizes the viewing state which is the current viewing behavior of the user using the viewing behavior model defined by the read parameter and outputs the state ID representing the viewing state to the viewing behavior prediction section 18.

In step S14, the viewing behavior prediction section 18 predicts the viewing behavior in the N-th viewing operation step from the time T with the viewing state at the current time T as the starting point. The viewing behavior prediction section 18 outputs the state ID representing the viewing behavior of the prediction result to the display control section 19.

In a normal HMM, a time step and a data (operation) step are identical. However, herein, prediction is about the N-th viewing operation step from the time T since each piece of data of the viewing log processed in the information processing device 1 includes the information of the time. Thus, the time step and the data (viewing log) step are not identical. In other words, the respective pieces of the data are not aligned at regular intervals on a time line. The HMM which has been learned from such data not at regular intervals on the time line also does not represent a pattern at regular intervals on the time line.

In step S15, the display control section 19 specifies the program predicted to be viewed upon the selection of the channel based on the state ID supplied from the viewing behavior prediction section 18 and causes the display device 2 to display the information relating to the specified program. Then, the process is terminated.

For example, in a screen displaying the information relating to the program, it is possible to set a timer for viewing or recording the program. When it is time of the broadcast of the program for which the timer for viewing or recording is set, the display device 2 starts receiving or recording the program.

[About Multistream Ergodic HMM]

The multistream ergodic HMM used by the information processing device 1 in order to predict the viewing behavior of the user is described.

Figure 5:
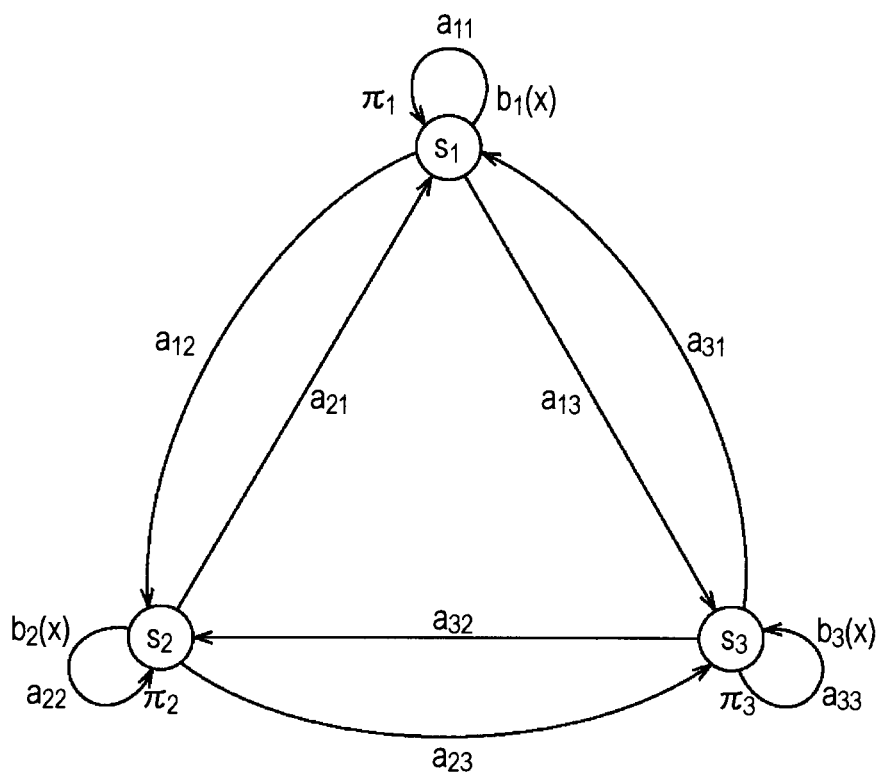
FIG. 5 illustrates an example of an HMM.

FIG. 5 illustrates an example of an HMM.

The HMM is a state transition model including a state and a state transition. FIG. 5 is the example of the HMM with three states. In FIG. 5, a circle represents a state corresponding to the viewing behavior of the user, and an arrow represents the state transition.

In FIG. 5, the state is represented as $s_i$ (i=1, 2, 3) and a state transition probability from a state $s_i$ to a state $s_j$ is represented as $a_{ij}$. An output probability density function for an observation value x observed at the time of the state transition to the state $s_i$ is represented as $b_I(x)$, and an initial probability of the state $s_i$ being an initial state is represented as $\pi_i$. For the output probability density function $b_i(x)$, a contaminated normal probability distribution or the like is used, for example.

The HMM (continuous HMM) is defined by a state transition probability $a_{ij}$, an output probability density function $b_i(x)$, and an initial probability $\pi_i$. The state transition probability $a_{ij}$, the output probability density function $b_i(x)$, and the initial probability $\pi_i$ are referred to as a parameter $\lambda$ ($\lambda=\{a_{ij}, b_i(x), \pi_i, i=1, 2, \ldots, M, j=1, 2, \ldots, M\}$) of the HMM. The number of states of the HMM is represented as M.

As a method of estimating the parameter $\lambda$ of the HMM, a Baum-Welch maximum likelihood estimation method is widely used. The Baum-Welch maximum likelihood estimation method is an estimation method for a parameter based on an expectation-maximization (EM) algorithm.

According to the Baum-Welch maximum likelihood estimation method, estimation of the parameter $\lambda$ of the HMM is performed based on observed time series data x ($x=x_1, x_2, \ldots, x_T$) so as to maximize the likelihood obtained from the occurrence probability which is a probability of the time series data being observed. Herein, a signal (sample value) observed at time t is represented as $x_t$, and a length (number of samples) of the time series data is represented as T.

The Baum-Welch maximum likelihood estimation method is described, for example, in page 333 of "Pattern Recognition and Machine Learning (Information Science and Statistics)," Christopher M. Bishop, Springer, N.Y., 2006 (referred to below as Document A).

The time series data x (x=$x_1, x_2, \ldots, x_T$) is supplied to the viewing behavior model learning section 15 from the viewing operation input section 11, the day-of-the-week information input section 12, the time information input section 13, and the viewing operation duration input section 14. The viewing behavior model learning section 15 estimates the parameter $\lambda$ of the HMM which is the viewing behavior model using the time series data x (x=$x_1, x_2, \ldots, x_T$) obtained from the viewing log.

Note that the Baum-Welch maximum likelihood estimation method is a parameter estimation method based on likelihood maximization, but does not guarantee optimality. Convergence to a local solution may occur depending on the structure of the HMM or an initial value of the parameter $\lambda$.

The HMM is widely used in speech recognition. In the HMM used in the speech recognition, the number of states, manner of state transition, or the like is generally determined in advance.

Figure 6:
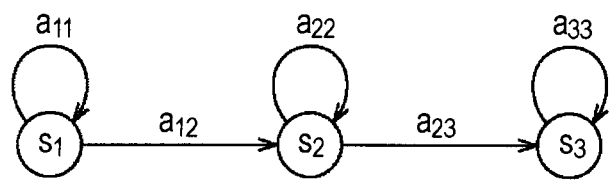
FIG. 6 illustrates a left-to-right HMM.

FIG. 6 illustrates a left-to-right HMM used in the speech recognition.

In the example of FIG. 6, the number of states is three, and the structure restricts the state transition only to a self transition (state transition from the state $s_i$ to the state $s_i$) and a state transition to an adjacent state from left to right.

As opposed to the HMM with a constraint on the state transition as in the HMM shown in FIG. 6, the HMM without a constraint on the state transition as shown in FIG. 5, i.e., the HMM in which the state transition from the arbitrary state $s_i$ to the arbitrary state $s_j$ is possible, is referred to as an ergodic HMM.

The ergodic HMM is an HMM having a structure with the highest degree of freedom, but increasing the number of states causes difficulty in estimating the parameter $\lambda$.

For example, when the number of states of the ergodic HMM is 1000, the number of state transitions is one million (i.e., 1000×1000). Thus, in this case, there are one million estimates for the state transition probability $a_{ij}$ as the parameter $\lambda$, for example.

Thus, the constraint (sparsity constraint) for a sparse structure may be applied to the state transition set for the state.

Herein, the sparse structure is a structure in which a state allowing the state transition from one state is extremely limited, unlike the ergodic HMM in which the state transition is dense such that the state transition is possible from an arbitrary state to an arbitrary state. Note that, herein, at least one state transition to another state exists and the self transition also exists even in the sparse structure.

FIGS. 7A and 7B illustrate the HMM applied with the sparsity constraint.

In examples in FIGS. 7A and 7B, a total of 16 states are arranged, four horizontally and four vertically, in a grid pattern in two-dimensional space. A two-way arrow connecting two states represents the state transition from one to the other of the two states and vice versa. In FIGS. 7A and 7B, the self transition is possible in each state, but an arrow representing the self transition is omitted.

Assuming that the distance between the states adjacent in the horizontal direction and the distance between the states adjacent in the vertical direction are both 1, the HMM shown in FIG. 7A is applied with the sparsity constraint such that the state transition to the state at which the distance is less than or equal to 1 is possible but the state transition is not allowed otherwise.

FIG. 7B shows the HMM applied with the sparsity constraint such that the state transition to the state at which the distance is less than or equal to $\sqrt{2}$ is possible but the state transition is not allowed otherwise. In the viewing behavior model used in the information processing device 1, the multistream ergodic HMM applied with the sparsity constraint in this manner is used.

The viewing state recognition section 17 applies a Viterbi method with respect to the viewing behavior model (HMM) obtained through learning to obtain a maximum-likelihood path which is a course of the state transition (sequence of the states) that maximizes the likelihood of the time series data x (x=$x_1, x_2, \ldots, x_T$) obtained from the viewing log being observed. Accordingly, the viewing state which is the current viewing behavior of the user is recognized.

Herein, the Viterbi method is an algorithm which determines, out of paths of the state transition with each state $s_i$ as the starting point, a path (maximum-likelihood path) that maximizes the occurrence probability representing, as values accumulated according to the length T of the time series data x, the state transition probability $a_{ij}$ of the state transition from the state $s_i$ to the state $s_j$ at the time t and the probability of a sample value $x_t$ at the time t being observed out of the time series data x (x=$x_1, x_2, \ldots, x_T$) in the state transition.

The viewing behavior prediction section 18 applies a forward algorithm with respect to the viewing behavior model (HMM) obtained through learning to calculate the occurrence probability of each state $s_i$ in the N-th viewing operation step from the time T with the viewing state which is the current viewing behavior of the user as the starting point.

Note that, as a calculation method of the occurrence probability, a method is employed in which the occurrence probability of each state $s_i$ in the N-th viewing operation step from the time T is calculated based on the state transition probability $a_{ij}$ on the assumption that an observation probability of each state $s_i$ at each point in time is an equal probability. Also, a method of calculating the occurrence probability of each state $s_{ij}$ in the N-th viewing operation step from the time T which is determined experientially using a random number based on the state transition probability $a_{ij}$ may be employed.

Herein, the forward algorithm is an algorithm in which a forward probability $\alpha_i(t)$ obtained by a forward propagation in the time direction is calculated as the probability of reaching each state $s_i$. When the observation probability of each state at each point in time is given, a forward-backward algorithm may be used in which a probability value based on the forward probability $\alpha_i(t)$ and a backward probability $\beta_i(t)$ obtained by a backward propagation is calculated as the probability of reaching each state $s_i$.

The Viterbi method is described in page 347 of Document A. Also, the forward algorithm is described in page 336 of Document A.

Figure 8:
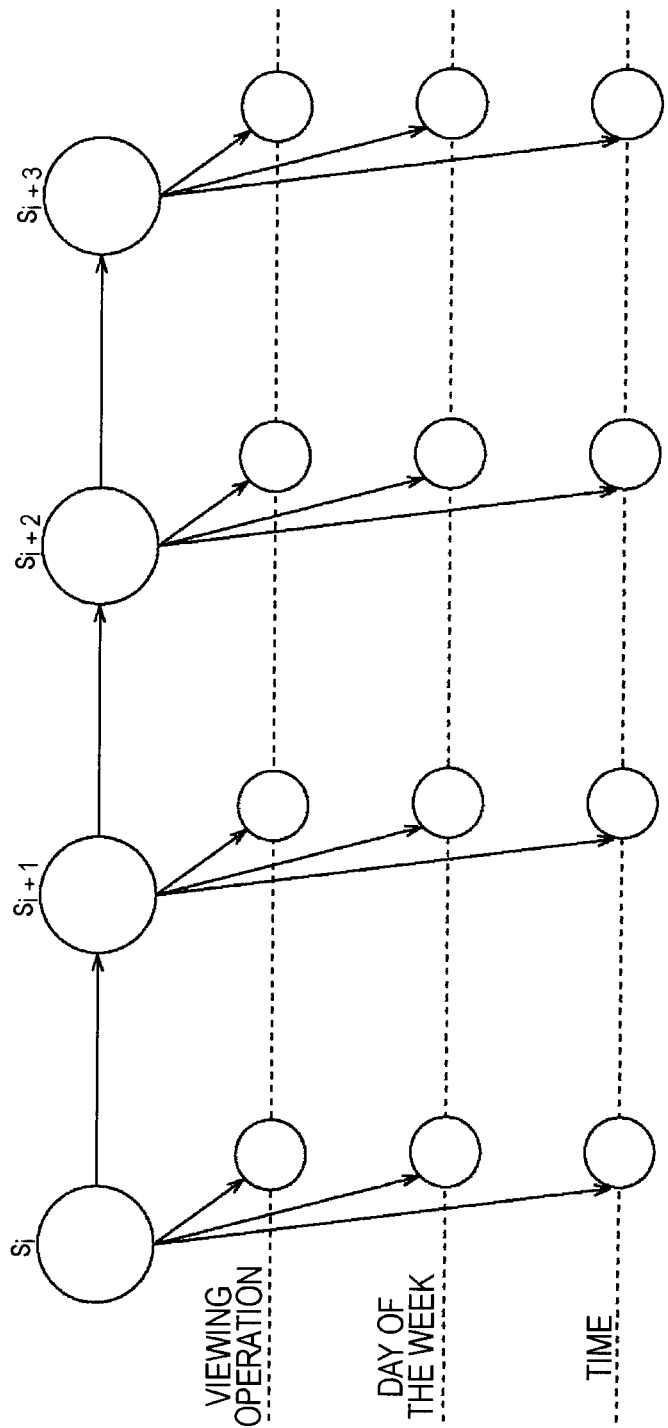
FIG. 8 illustrates a multistream ergodic HMM.
Figure 9:
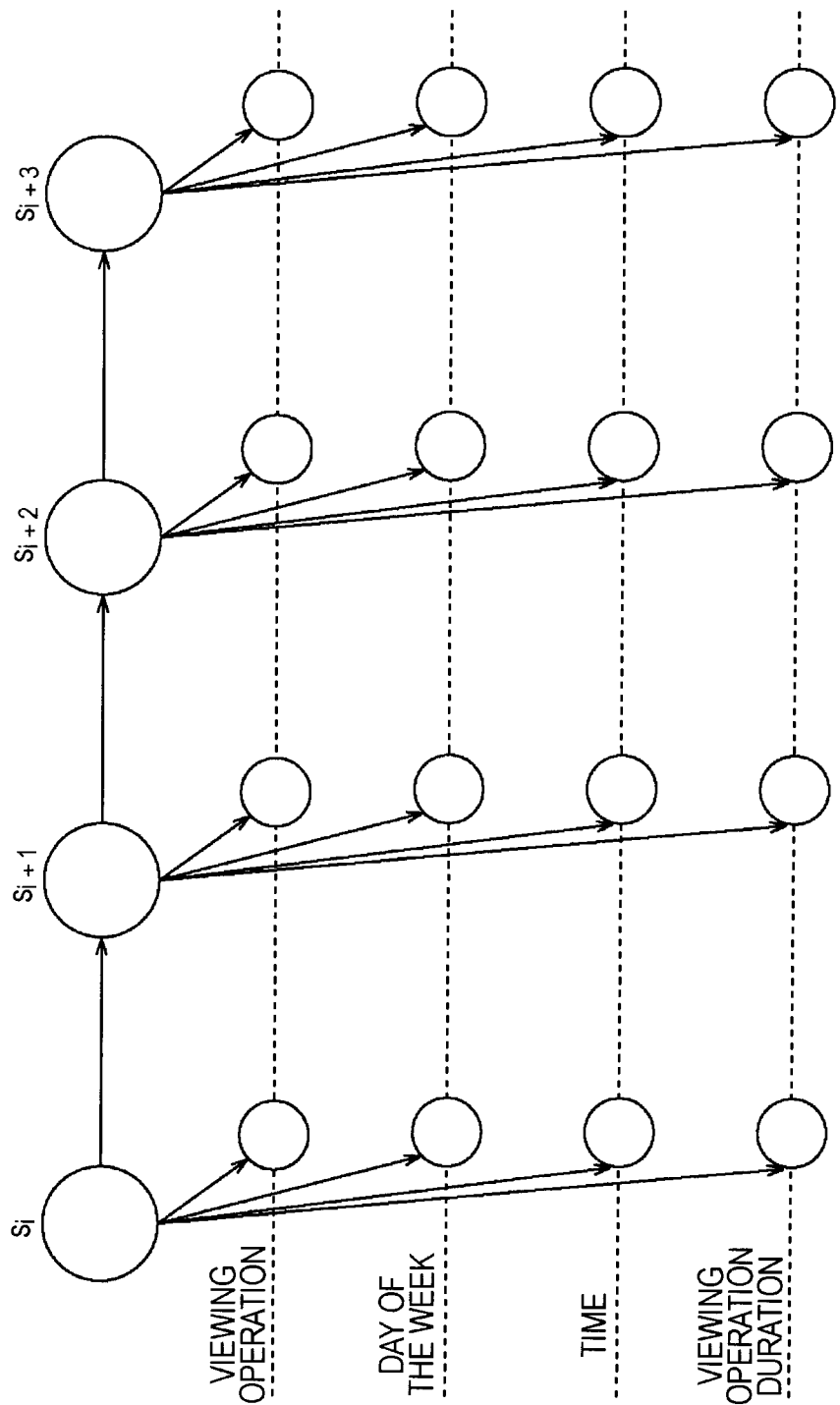
FIG. 9 illustrates another multistream ergodic HMM.

FIGS. 8 and 9 illustrate examples of the multistream ergodic HMM.

FIG. 8 shows the multistream ergodic HMM when three types of the time series data (three streams) of the operation ID, the day of the week, and the time are used. FIG. 9 shows the multistream ergodic HMM when the time series data of the viewing operation duration in addition to the three types of the time series data (i.e., four streams) is used.

Herein, regarding the time series data of the operation ID and the day of the week, an observation model is used in which a symbol, i.e., a discrete value, is treated as an observation signal. Regarding the time series data of the time and the viewing operation duration, an observation model (normal distribution model) is used in which a continuous value is treated as the observation signal.

Note that a multistream HMM is an HMM in which data is output according to a plurality of different probability laws from a state where a transition probability is similar to that in the normal HMM. In the multistream HMM, the output probability density function $b_i(x)$ as the parameter $\lambda$ is prepared for each type (stream) of the time series data.

The overall observation probability at the time t relating to the state $s_i$ when the observation value x is given is represented as follows in an expression (1), in the case of three streams shown in FIG. 8.

$$b_i(x_t) = b_i^{op}(x_t^{op})^{w^{op}} b_i^{day}(x_t^{day})^{w^{day}} b_i^{time}(x_t^{time})^{w^{time}} b_i^{duration}(x_t^{duration})^{w^{duration}} \quad (3)$$

In the expression (1), the output probability density function corresponding to the time series data of the operation ID is represented as $b_i^{OP}(x_t^{OP})$, and the output probability density function corresponding to the time series data of the day of the week is represented as $b_i^{day}(x_t^{day})$. The output probability density function corresponding to the time series data of the time is represented as $b_i^{time}(x_t^{time})$. Exponents $w^{op}$, $w^{day}$, and $w^{time}$ given with respect to the respective output probability density functions satisfy the following condition in an expression (2).

$$w^{op} + w^{day} + w^{time} = 1 \quad (2)$$

The overall observation probability at the time t relating to the state $s_i$ when the observation value x is given is represented as follows in an expression (3), in the case of four streams shown in FIG. 9.

$$b_i(x_t) = b_i^{op}(x_t^{op})^{w^{op}} b_i^{day}(x_t^{day})^{w^{day}} b_i^{time}(x_t^{time})^{w^{time}} b_i^{duration}(x_t^{duration})^{w^{duration}} \quad (3)$$

The output probability density function corresponding to the time series data of the viewing operation duration is represented as $b_i^{duration}(x_t^{duration})$. Exponents $w^{op}$, $w^{day}$, $w^{time}$, and $w^{duration}$ given with respect to the respective output probability density functions satisfy the following condition in an expression (4).

$$w^{op} + w^{day} + w^{time} + w^{duration} = 1 \quad (4)$$

In this manner, the viewing behavior of the user is learned (as an integrative learning) in the information processing device 1 in a form that associates the operation ID, the day of the week, and the time when three streams are used or the operation ID, the day of the week, the time, and the viewing operation duration when four streams are used.

[Specific Example of Data]

FIG. 10 illustrates an example of the viewing log.

As shown in FIG. 10, the viewing log sent to the information processing device 1 from the remote controller 3 includes the date, the day of the week, the time, and the content of the viewing operation. The uppermost viewing log in FIG. 10 represents that the channel-selecting operation for channel 1 has been performed at 10:55 on the Saturday of November 21.

Figure 11:
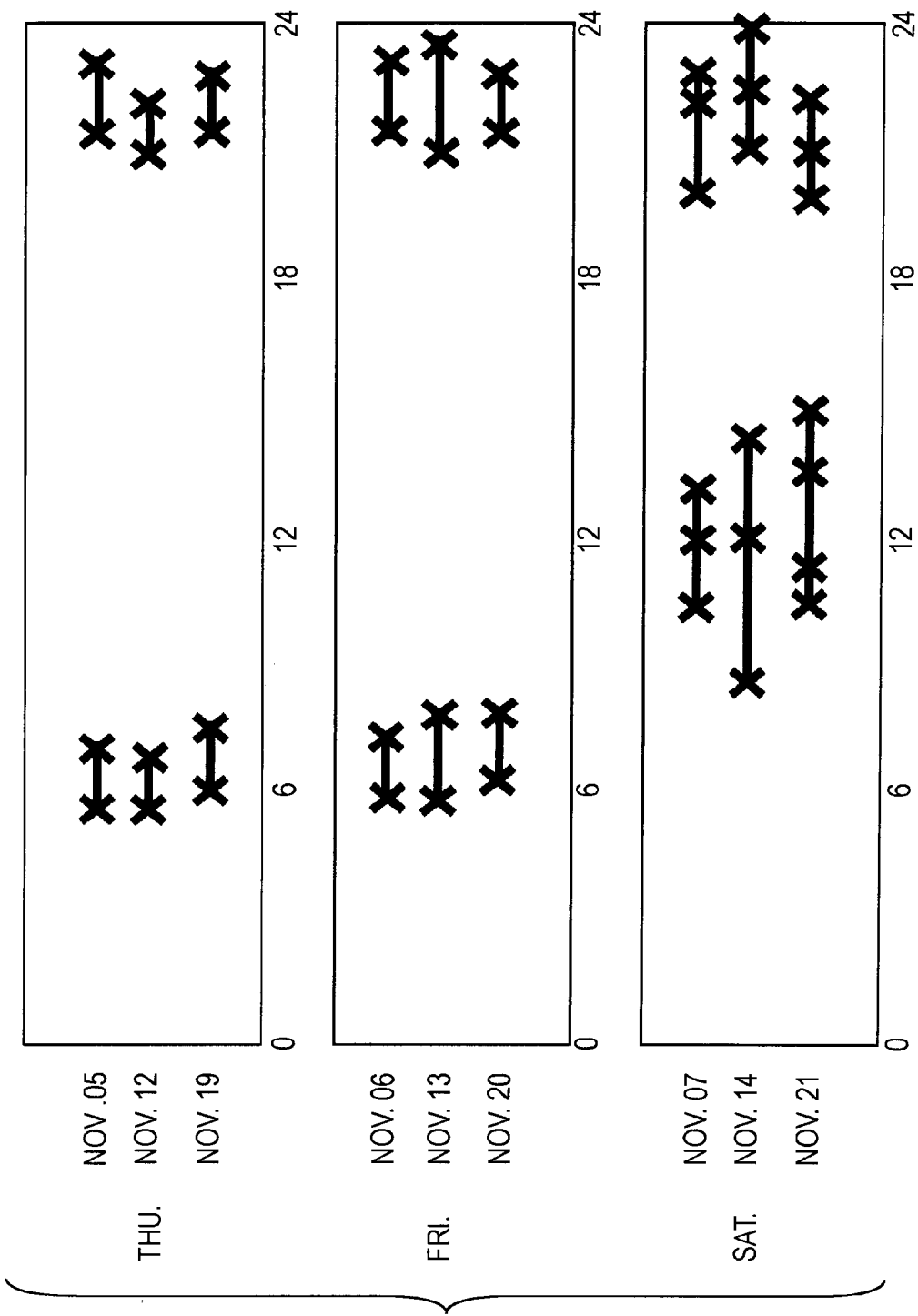
FIG. 11 illustrates an example of information generated based on the viewing log.

FIG. 11 illustrates an example of information generated based on the viewing log.

FIG. 11 shows a result of classifying the viewing log shown in FIG. 10 according to the day of the week and plotting a channel selection starting operation and a channel selection terminating operation for a predetermined channel on a plane with the abscissa as the time line and the ordinate showing the date. For example, the viewing log shown in FIG. 11 is generated in the information processing device 1 based on the viewing log sent from the remote controller 3. In FIG. 11, an upper portion represents the viewing behavior on Thursday, and a middle portion represents the viewing behavior on Friday. A lower portion represents the viewing behavior on Saturday.

In this manner, the learning of the viewing behavior of the user may be performed based on the information generated from the viewing log shown in FIG. 10 and showing the relation among the day of the week, the date, and viewing time of content.

Figure 12:
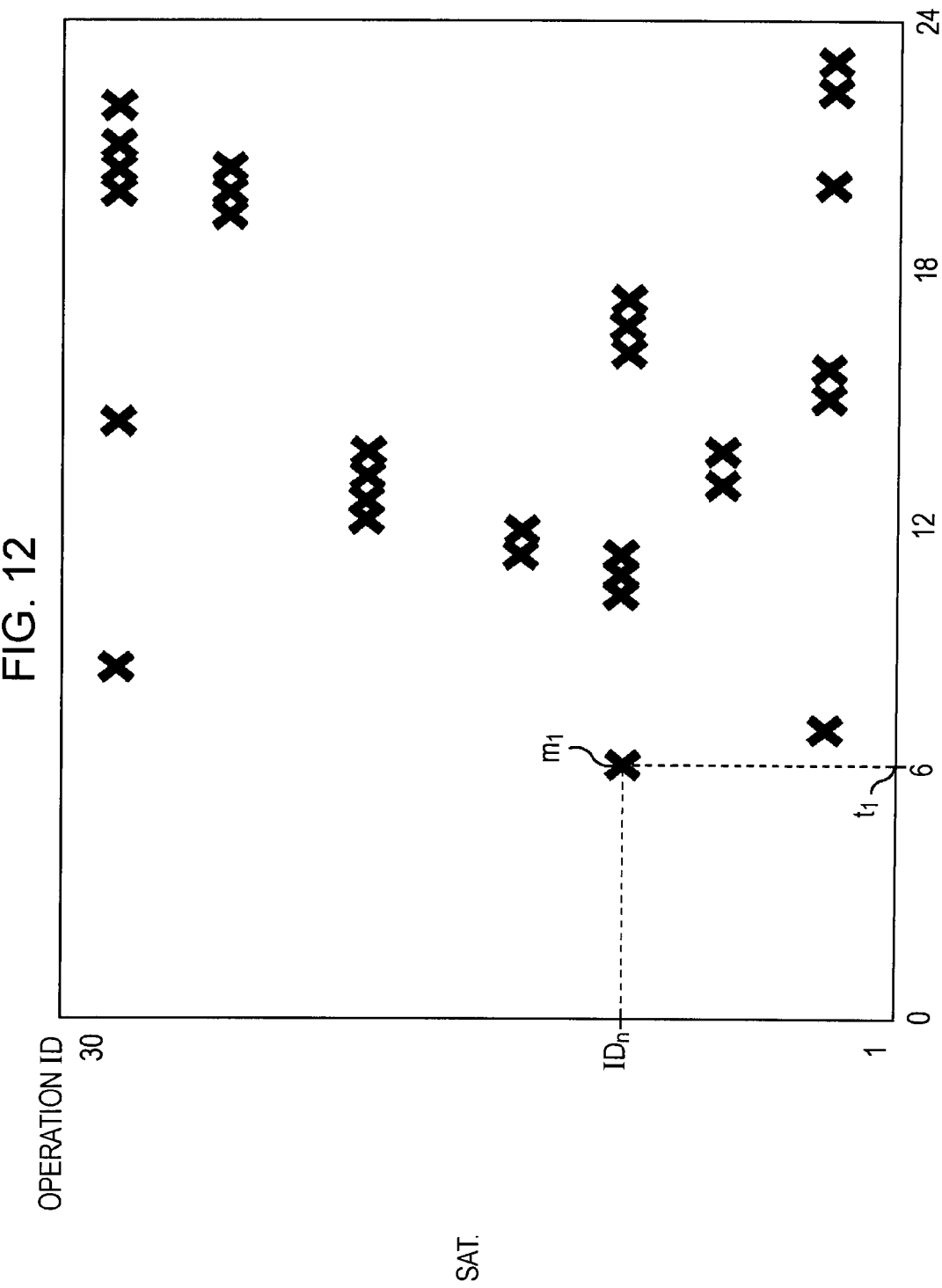
FIG. 12 illustrates another example of the information generated based on the viewing log.

FIG. 12 illustrates an example of the information generated based on the viewing log.

FIG. 12 shows a result of classifying the viewing log shown in FIG. 10 according to the day of the week and plotting the viewing log on a plane with the abscissa as the time line and the ordinate showing the operation ID. For example, the information shown in FIG. 12 is generated based on the viewing log sent from the remote controller 3. FIG. 12 represents the viewing operation on Saturday, and an x mark $m_1$ represents that the operation represented by an operation $ID_n$ has been performed at time $t_1$.

Figure 13:
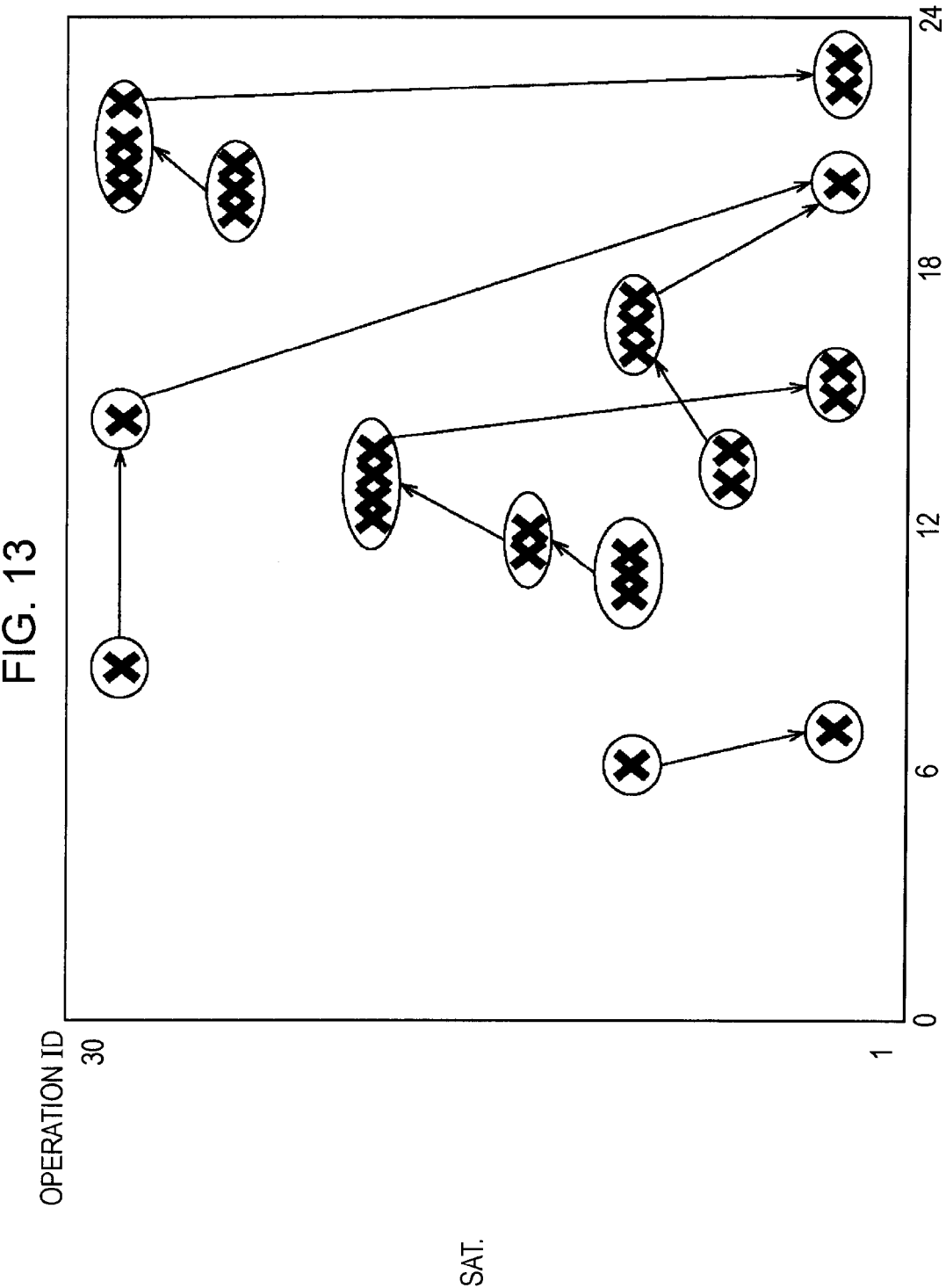
FIG. 13 illustrates an example of a learning result.

FIG. 13 illustrates a result of learning the viewing behavior of the user based on the information in FIG. 12.

In FIG. 13, each circle surrounding an x mark representing that a predetermined operation has been performed at each point in time corresponds to the state of the multistream ergodic HMM obtained through learning, and an arrow connecting two circles corresponds to the state transition in the multistream ergodic HMM.

Figure 14:
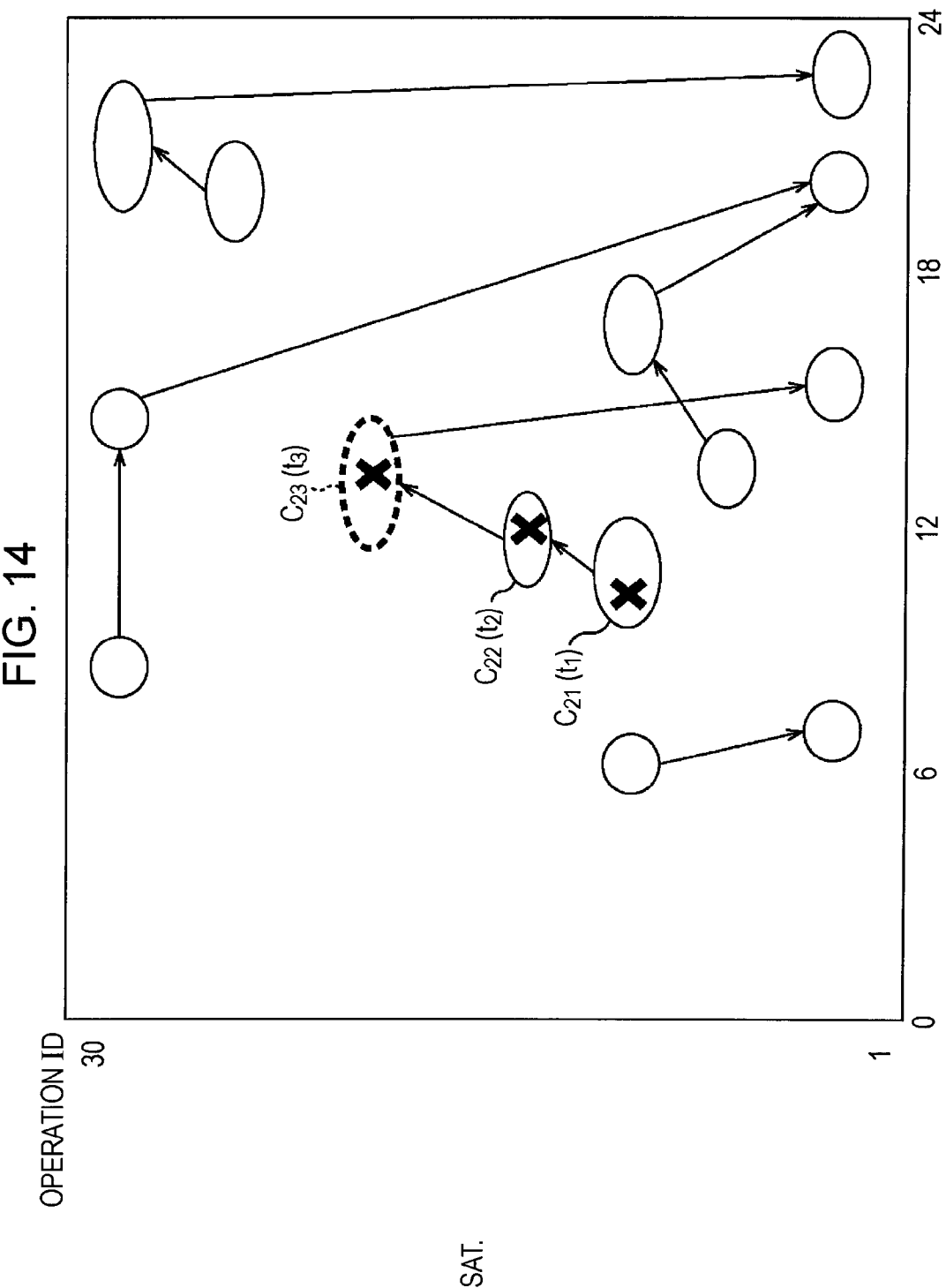
FIG. 14 illustrates an example of a recognition result of a viewing state.

FIG. 14 illustrates an example of a result of recognition of the viewing state performed by the viewing state recognition section 17 using the learning result in FIG. 13.

In the example in FIG. 14, a state represented by a viewing state which is the current viewing behavior of the user from the viewing log acquired at each of time $t_1$, time $t_2$, and time $t_3$. Note that, in FIG. 14, a circle $C_{21}$ corresponds to the viewing state at the time $t_1$, and a circle $C_{22}$ corresponds to the viewing state at the time $t_2$.

Figure 15:
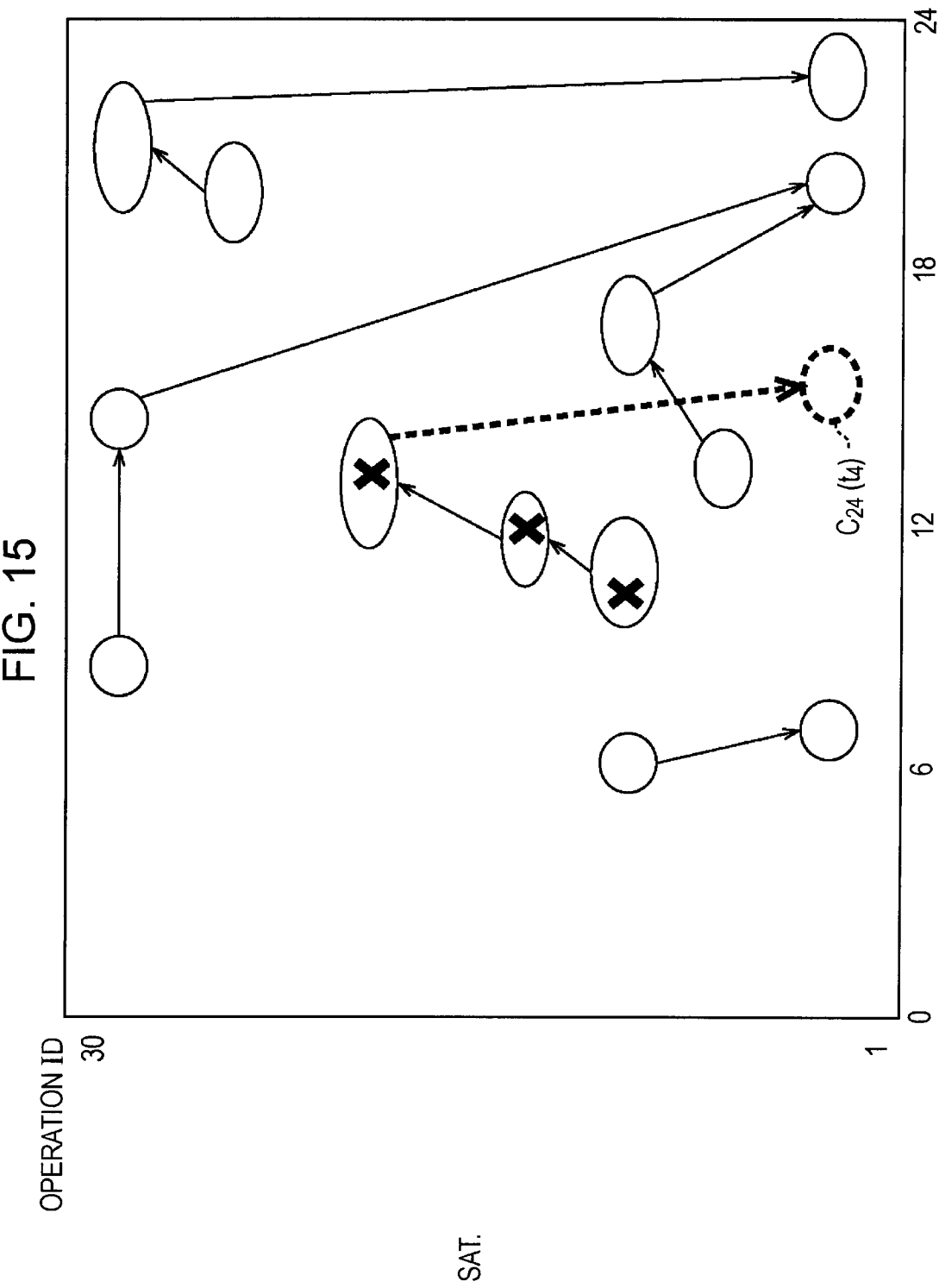
FIG. 15 illustrates an example of a prediction result.

FIG. 15 illustrates an example of a result of prediction of the viewing behavior performed by the viewing behavior prediction section 18 with the recognition result of the viewing state in FIG. 14 as the starting point.

In the example in FIG. 15, a behavior corresponding to a state represented by a circle $C_{24}$ shown by a broken line is predicted as the viewing behavior of the user at time $t_4$.

Figure 16:
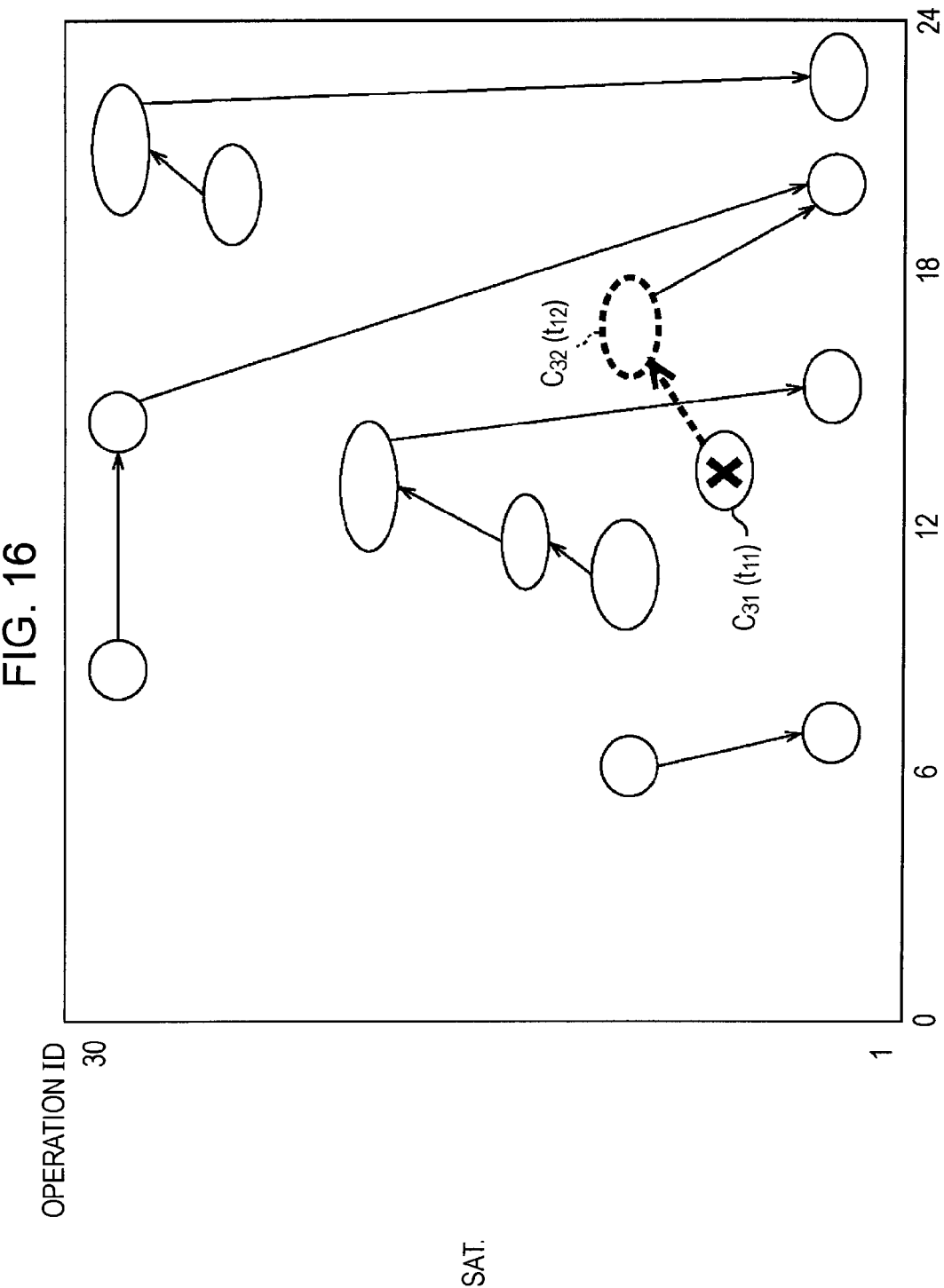
FIG. 16 illustrates another example of the prediction result.

FIG. 16 illustrates another example of the prediction result of the viewing behavior.

In the example in FIG. 16, a state represented by a circle $C_{31}$ is recognized as the viewing state which is the current viewing behavior of the user. Also, a behavior corresponding to a state represented by a circle $C_{32}$ shown by a broken line is predicted as the viewing behavior of the user at time $t_{12}$ with a state at time $t_{11}$ represented by the circle $C_{31}$ as the starting point.

Figure 17:
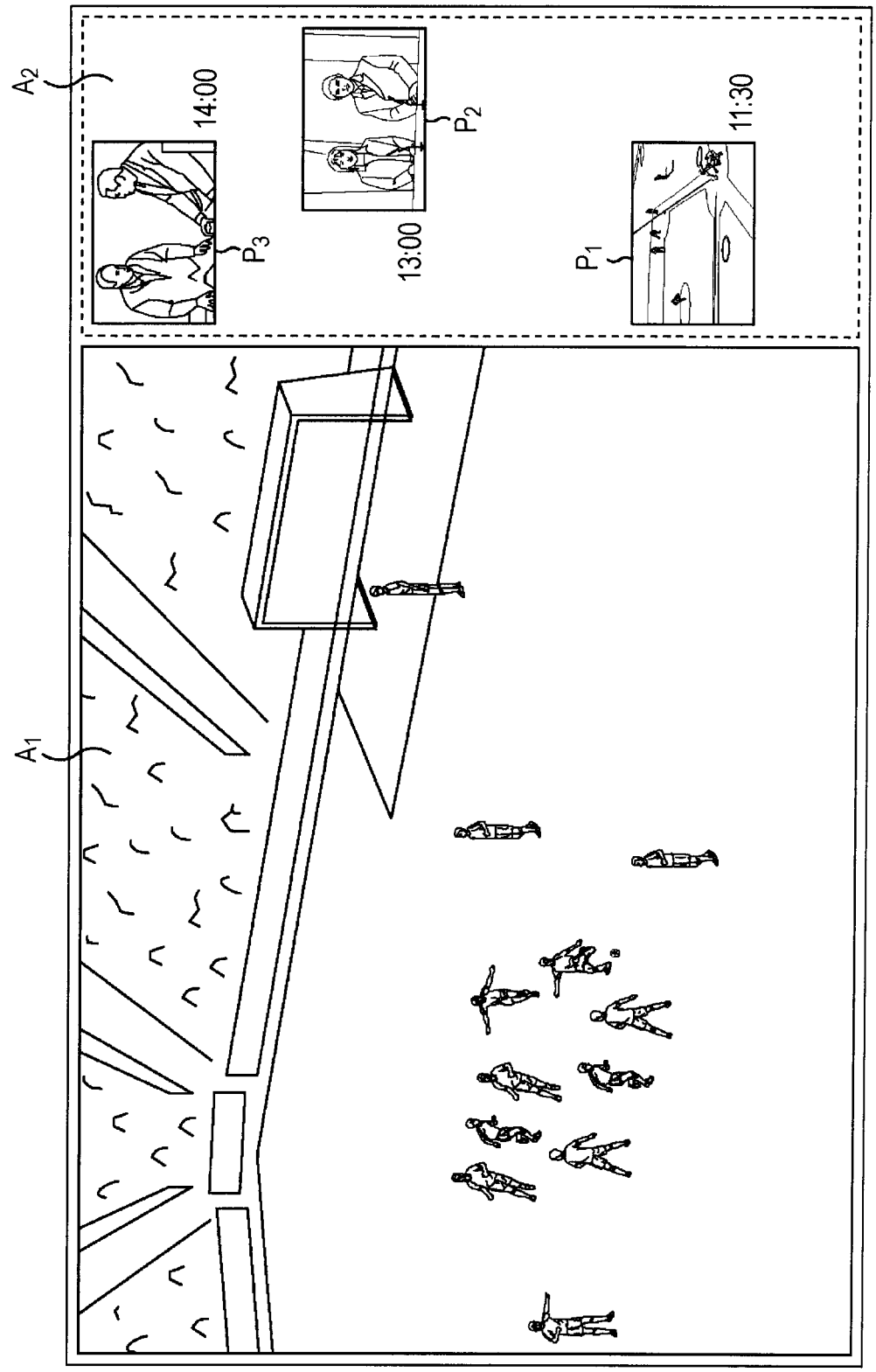
FIG. 17 illustrates an example of a screen display.

FIG. 17 illustrates a display example of the information relating to the program.

In the example in FIG. 17, a region $A_1$ and a region $A_2$ shown by a broken line are formed in the entire screen of the display section of the display device 2. The region $A_1$ is a region displaying an image of the program currently being viewed by the user, and the region $A_2$ is a region displaying the information relating to the program predicted to be viewed by the user.

For example, when the current time is 11:00, information relating to a program which is predicted to be viewed by the user following the program currently being viewed and of which the broadcast starts after 11:00 is displayed.

In the example in FIG. 17, a feature image $P_1$ which is information relating to a program #1 of which the broadcast starts at 11:30, a feature image $P_2$ which is information relating to a program #2 of which the broadcast starts at 13:00, and a feature image $P_3$ which is information relating to a program

3 of which the broadcast starts at 14:00 are displayed. The broadcast starting time of the program is displayed next to each feature image. The feature image and information of the broadcast starting time of the program are information acquired from the EPG data.

When the user selects, for example, the feature image $P_1$ through operation of the remote controller 3 or the like, a timer for viewing or recording the program #1 is set, and a channel selection or recording of the program #1 starts automatically without an operation by the user when it is the broadcast starting time at 11:30.

In this manner, it is possible to display the information relating to the program predicted to be viewed by the user next to the image of the program being viewed. Since the viewing log is acquired for every performed viewing operation to predict the viewing behavior, the display of the region $A_1$ is switched every time the viewing operation is performed by the user.

Figure 18:
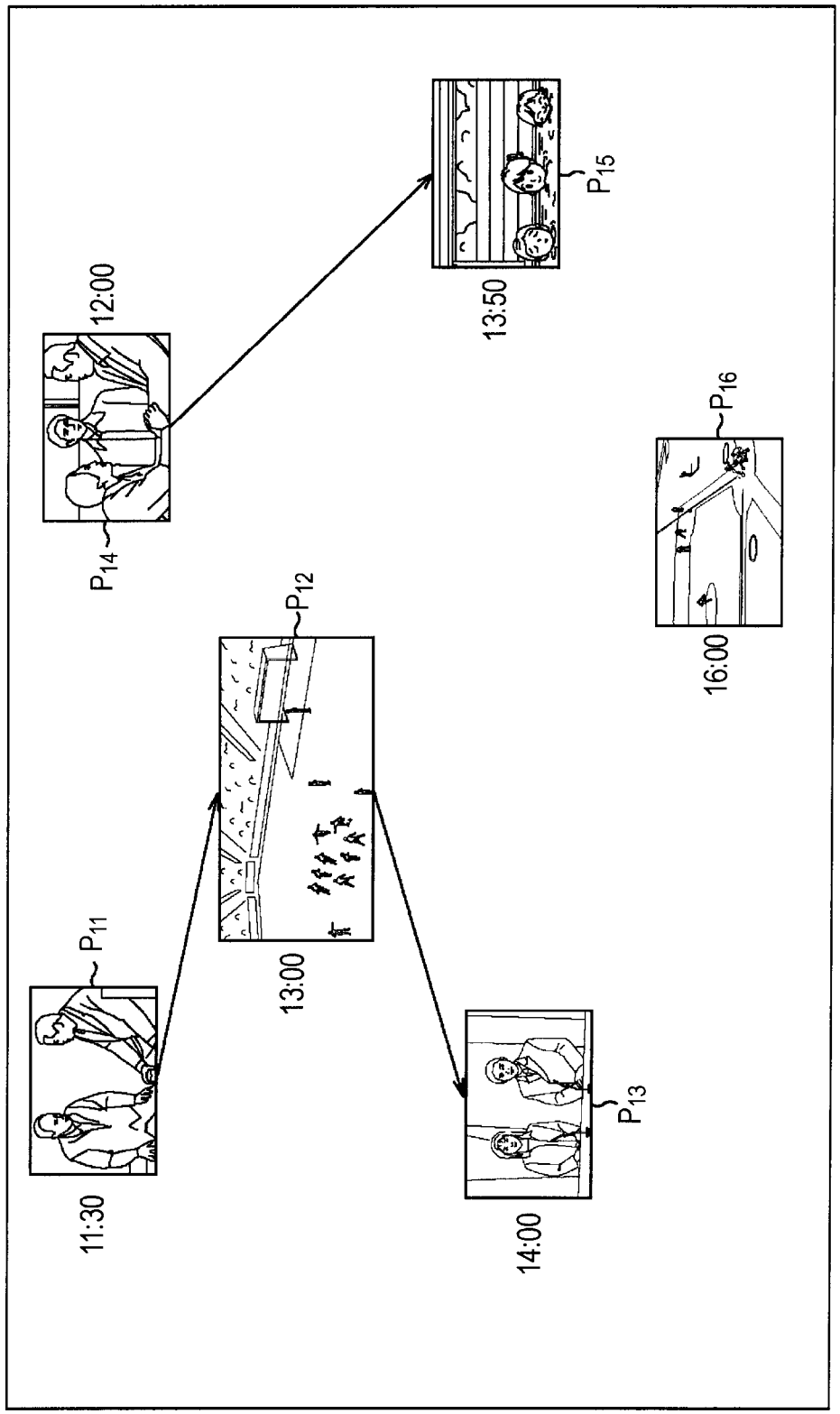
FIG. 18 illustrates another example of the screen display.

FIG. 18 illustrates another display example of the information relating to the program.

In the example in FIG. 18, the entire screen of the display device 2 is used to display feature images $P_{11}$ to $P_{16}$, respectively feature images of programs #11 to #16, as the information relating to the program predicted to be viewed by the user. The broadcast starting time of the program is displayed next to each feature image.

Also, in the example in FIG. 18, the feature image $P_{11}$ and the feature image $P_{12}$ are connected by an arrow pointing to the feature image $P_{12}$ from the feature image $P_{11}$ since the program #12 is predicted to be viewed following the program #11. In a similar manner, the feature image $P_{12}$ and the feature image $P_{13}$ are connected by an arrow pointing to the feature image $P_{13}$ from the feature image $P_{12}$ since the program #13 is predicted to be viewed following the program #12.

Further, a viewing pattern in which the programs #14 and #15 are viewed consecutively is also obtained in the prediction result as a viewing pattern different from a viewing pattern in which the programs #11, #12, and #13 are viewed consecutively. The feature image $P_{14}$ which is information relating to the program #14 and the feature image $P_{15}$ which is information relating to the program #15 are connected by an arrow pointing to the feature image $P_{15}$ from the feature image $P_{14}$.

In this manner, it may be such that a plurality of paths of which the occurrence probability in the N-th viewing operation step from the time T is greater than or equal to a predetermined threshold value in the viewing behavior model are selected, and the information relating to the program predicted to be viewed through the viewing behavior corresponding to the states forming each path is aligned and displayed in chronological order.

Also, it may be such that an identical setting is performed in line with the predicted viewing pattern, e.g., timers for viewing the programs #12 and #13 predicted to be viewed following the program #11 are set when the feature image $P_{11}$ is selected and a timer for viewing the program #11 is set.

[Modification Example]

Figure 19:
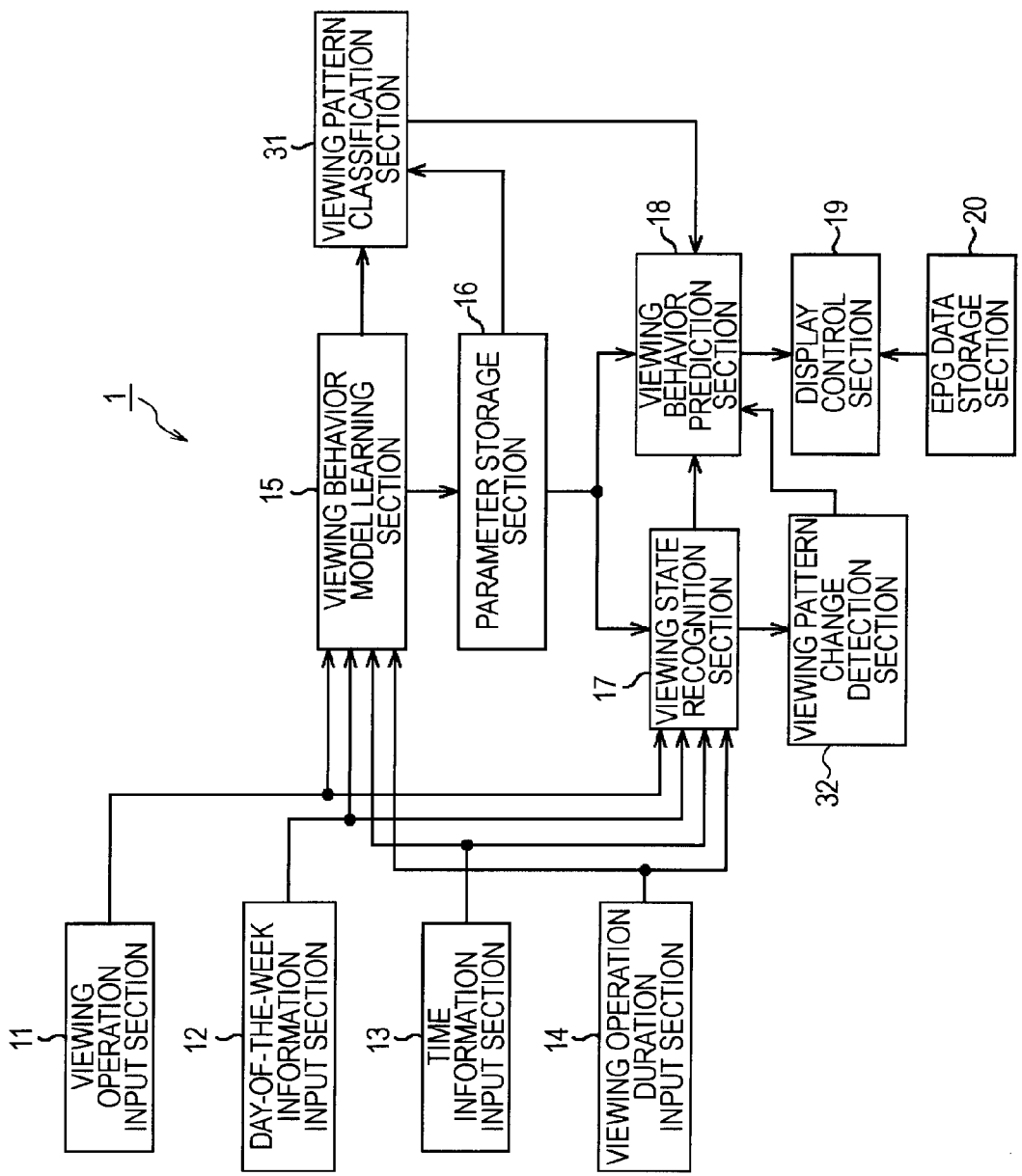
FIG. 19 is a block diagram showing another configuration example of the information processing device.

FIG. 19 is a block diagram showing another configuration example of the information processing device 1.

In FIG. 19, components identical to those shown in FIG. 2 are denoted by the same reference numerals. Redundant description is omitted as appropriate. The configuration shown in FIG. 19 differs from the configuration shown in FIG. 2 in that a viewing pattern classification section 31 and a viewing pattern change detection section 32 are provided in addition.

The classification of the viewing pattern by the viewing pattern classification section 31 is described.

The prediction of the viewing behavior is desirably performed when there is regularity in the viewing pattern of the user. When there is not regularity in the viewing pattern of the user, the reliability of the information relating to the program which is displayed based on the prediction result is low in terms of prediction accuracy.

Herein, the regularity being in the viewing pattern indicates the existence of the viewing pattern, such as a user watching the news broadcast on channel 1 at 7:00 in the morning every Monday through Friday or watching a program broadcast on channel 8 from 19:00 in the evening after watching a program broadcast on channel 6 at 18:00 in the evening every Sunday. On the contrary, the regularity not being in the viewing pattern indicates that such viewing pattern does not exist. In actual practice, whether there is regularity in the viewing pattern is not a binary decision, and there is a continuous distribution from a case of strong regularity to a case of weak regularity.

The viewing pattern classification section 31 determines whether the likelihood obtained by the viewing behavior model learning section 15 at the time of the learning of the viewing behavior model is higher than a threshold value. This determination is performed at a predetermined timing such as when the learning of the viewing behavior model has ended, before the prediction of the viewing behavior is performed by the viewing behavior prediction section 18.

The viewing pattern classification section 31 determines that there is regularity in the viewing pattern of the user when the likelihood is higher than the threshold value. In this case, the viewing pattern classification section 31 validates the viewing behavior model and permits the viewing behavior prediction section 18 to perform the prediction using the viewing behavior model.

On the other hand, the viewing pattern classification section 31 determines that there is not regularity in the viewing pattern of the user when the likelihood is lower than the threshold value. In this case, the viewing pattern classification section 31 invalidates the viewing behavior model and controls the viewing behavior prediction section 18 not to perform the prediction using the viewing behavior model.

Note that a likelihood L relating to an observation signal X (the time series data used in the learning) can be obtained as follows in an expression (5) using a parameter θ of the viewing behavior model.

$$L(X)=p(X|\theta) \tag{5}$$

Accordingly, it is possible to prevent a pointless prediction, so to speak, such as a prediction of the viewing behavior despite the absence of regularity in the viewing pattern of the user.

The presence or absence of regularity may be determined using entropy of the viewing behavior model after the learning, instead of the likelihood at the time of the learning.

When using the entropy of the viewing behavior model, the viewing pattern classification section 31 reads the parameter of the viewing behavior model stored in the parameter storage section 16 and calculates an entropy H according to a following expression (6).

$$H(\theta) = -\sum_{i=1}^{N} \theta \log(\theta) \tag{6}$$

The viewing pattern classification section 31 determines whether the calculated entropy H is higher than a threshold value. This determination is performed when the learning of the viewing behavior model has ended and before the prediction of the viewing behavior is performed by the viewing behavior prediction section 18.

The viewing pattern classification section 31 determines that there is regularity in the viewing pattern of the user when the entropy H is lower than the threshold value. In this case, the viewing pattern classification section 31 validates the viewing behavior model and permits the viewing behavior prediction section 18 to perform the prediction using the viewing behavior model.

On the other hand, the viewing pattern classification section 31 determines that there is not regularity in the viewing pattern of the user when the entropy H is higher than the threshold value. In this case, the viewing pattern classification section 31 invalidates the viewing behavior model and controls the viewing behavior prediction section 18 not to perform the prediction using the viewing behavior model.

Note that instead of prohibiting the prediction when there is not regularity in the viewing pattern of the user, it may be such that the prediction is permitted and information such as the reliability of the prediction result according to a value of the likelihood or the entropy is displayed together with the information relating to the program which is specified based on the prediction result.

The change detection of the viewing pattern by the viewing pattern change detection section 32 is described.

The prediction of the viewing behavior is desirably performed when the current viewing pattern (transition of the viewing behavior up to current time) of the user is a usual viewing pattern. When the current viewing pattern of the user is an unusual viewing pattern not in line with the normal viewing pattern of the user, the reliability of the information relating to the program which is displayed based on the prediction result is low in terms of prediction accuracy.

Herein, the current viewing pattern of the user being a usual viewing pattern indicates that the current viewing pattern of the user is the expected viewing pattern, given the existence of the viewing pattern such as a user watching the news broadcast on channel 1 at 7:00 in the morning every Monday through Friday or watching a program broadcast on channel 8 from 19:00 in the evening after watching a program broadcast on channel 6 at 18:00 in the evening every Sunday.

On the contrary, the current viewing pattern of the user being an unusual viewing pattern indicates that the current viewing pattern of the user is out of line with the expected viewing pattern. In the case of this example, a viewing pattern such as a program broadcast on channel 8 at 7:00 in the morning being watched on Tuesday or a program broadcast on channel 10 from 19:00 in the evening being watched after the program broadcast on channel 6 at 18:00 in the evening is watched on Sunday is an unusual viewing pattern.

When the current viewing pattern of the user is an unusual viewing pattern, a change in the viewing pattern is detected by the viewing pattern change detection section 32. In actual practice, whether there is a change in the viewing pattern is not a binary decision, and there is a continuous distribution from a case of great change to a case of small change.

For example, the viewing pattern change detection section 32 detects a change in the viewing pattern using likelihood information obtained at the time of recognition of the viewing state. That is, the detection of the change in the viewing pattern by the viewing pattern change detection section 32 is performed after the learning of the viewing behavior model and before the prediction of the viewing behavior.

As the likelihood information, a value of a logarithm of the likelihood (logarithmic likelihood) calculated by the viewing state recognition section 17 or a value representing a ratio of an average likelihood at the time of the recognition of the viewing state with respect to a learning sample (likelihood obtained using the time series data at the time of the learning) may be used, for example.

When the likelihood information is higher than a threshold value, the viewing pattern change detection section 32 determines that the current viewing pattern of the user is usual, i.e., a change is not there. In this case, the viewing pattern change detection section 32 validates the viewing state recognized by the viewing state recognition section 17 and permits the viewing behavior prediction section 18 to perform the prediction with the viewing state as the starting point.

On the other hand, when the likelihood information is lower than the threshold value, the viewing pattern change detection section 32 determines that the current viewing pattern of the user is unusual, i.e., there is a change. In this case, the viewing pattern change detection section 32 invalidates the viewing state recognized by the viewing state recognition section 17 and controls the viewing behavior prediction section 18 not to perform the prediction with the viewing state as the starting point.

Accordingly, it is possible to prevent a pointless prediction, so to speak, such as a prediction of the viewing behavior despite the current viewing pattern of the user being unusual.

Note that instead of prohibiting the prediction when the current viewing pattern of the user is unusual, it may be such that the prediction is permitted and the information such as the reliability of the prediction result according to the value of the likelihood is displayed together with the information relating to the program which is determined based on the prediction result.

The program for which the learning or the prediction of the viewing behavior is performed in a manner described above may be a program provided via broadcast waves or may be a program provided via a network such as the Internet.

Although a case where the learning or the prediction of the viewing behavior is performed for a broadcast program has been described above, the learning or the prediction of the viewing behavior may be performed for different content for which the user has a viewing pattern.

For example, when there is a pattern in the viewing behavior for a program recorded in a recorder such as a hard disk recorder, the learning or the prediction for the recorded program may be performed. Also, when there is a pattern in behavior of listening to a radio or behavior of browsing a Web page, the learning or the prediction may be performed for content thereof.

[Configuration Example of a Computer]

A sequence of the processes described above may be executed with hardware or may be executed with software. When the sequence of the processes is executed by software, a program included in the software is installed on a computer built in dedicated hardware, a general-purpose personal computer, or the like from a program recording medium.

Figure 20:
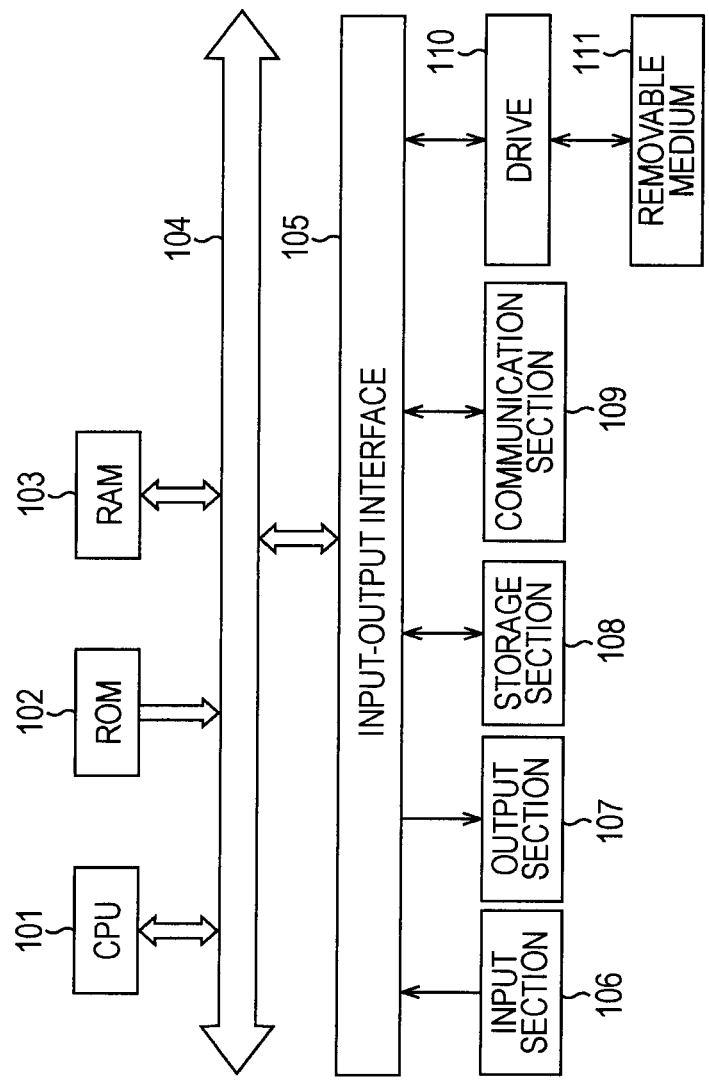
FIG. 20 is a block diagram showing a configuration example of a computer.

FIG. 20 is a block diagram showing a configuration example of hardware of a computer which executes the sequence of the processes described above with a program.

A central processing unit (CPU) 101, a read only memory (ROM) 102, and a random access memory (RAM) 103 are interconnected by a bus 104.

Further, an input-output interface 105 is connected to the bus 104. An input section 106 including a keyboard and a mouse and an output section 107 including a display and a speaker are connected to the input-output interface 105. Also, a storage section 108 including a hard disk or a nonvolatile memory, a communication section 109 including a network interface, and a drive 110 which drives a removable medium 111 are connected to the input-output interface 105.

In the computer configured as described above, the sequence of the processes described above is performed by, for example, a program stored in the storage section 108 being loaded in the RAM 103 and executed by the CPU 101 via the input-output interface 105 and the bus 104.

The program executed by the CPU 101 is, for example, recorded in the removable medium 111 or provided via a wired or wireless transmission medium such as a local area network, the Internet, or digital broadcasting and is installed in the storage section 108.

Note that the program executed by the computer may be a program which performs the processes in the chronological order described in this specification or may be a program which performs the processes in parallel or at appropriate timings such as upon a call.

The present application contains subject matter related to that disclosed in Japanese Priority Patent Application JP 2009-276913 filed in the Japan Patent Office on Dec. 4, 2009, the entire contents of which are hereby incorporated by reference.

Embodiments of the present invention are not limited the embodiment described above, and various modifications are possible within the scope of the present invention.

What is claimed is:

1. An information processing device comprising:
    acquisition means for acquiring a viewing log including information representing content of an operation for viewing content and time of the operation;
    learning means for learning, based on the viewing log acquired by the acquisition means, a viewing behavior model which is a stochastic state transition model representing a viewing behavior of a user;
    recognition means for recognizing, using the viewing behavior model obtained through learning by the learning means, a current viewing state of the user;
    prediction means for predicting, using the viewing behavior model, the viewing behavior of the user after a predetermined period of time with the current viewing state of the user recognized by the recognition means as a starting point; and
    display control means for displaying information relating to content predicted to be viewed through the viewing behavior predicted by the prediction means.

2. The information processing device according to claim 1, wherein the prediction means predicts the viewing behavior of the user after the predetermined period of time as an occurrence probability.

3. The information processing device according to claim 2, wherein the prediction means predicts the viewing behavior of the user after the predetermined period of time by assuming that an observation probability of each state at each point in time is an equal probability in the viewing behavior model and calculating the occurrence probability of each state after the predetermined period of time based on a state transition probability of the viewing behavior model.

4. The information processing device according to claim 2, wherein the prediction means predicts the viewing behavior of the user after the predetermined period of time by calculating the occurrence probability of each state within the predetermined period of time in the viewing behavior model which is determined experientially using a random number based on a state transition probability of the viewing behavior model.

5. The information processing device according to claim 3, wherein the prediction means predicts, as the viewing behavior of the used after the predetermined period of time, the viewing behavior of which the occurrence probability after the predetermined period of time is maximum or the viewing behavior of which the occurrence probability after the predetermined period of time is greater than or equal to a predetermined threshold value.

6. The information processing device according to claim 5, wherein the viewing behavior model is a hidden Markov model which is the stochastic state transition model including a hidden state and applied with a sparsity constraint.

7. The information processing device according to claim 5, wherein the viewing behavior model is a multistream hidden Markov model applied with a sparsity constraint.

8. The information processing device according to claim 1, further comprising control means for controlling the prediction means to not perform prediction using the viewing behavior model when a likelihood calculated by the learning means at a time of learning of the viewing behavior model is lower than a threshold value or when a value of an entropy of the viewing behavior model is higher than a threshold value.

9. The information processing device according to claim 1, further comprising control means for controlling the prediction means not perform prediction with the current viewing state of the user recognized by the recognition means as the starting point when a likelihood obtained at a time of recognition of the current viewing state of the user by the recognition means is lower than a threshold value.

10. An information processing method comprising the steps of: acquiring a viewing log including information representing content of an operation for viewing content and time of the operation;
    learning, based on the acquired viewing lag, a viewing behavior model which is a stochastic state transition model representing a viewing behavior of a user;
    recognizing, using the viewing behavior model obtained through learning, a current viewing state of the user;
    predicting, using the viewing behavior model, the viewing behavior of the user after a predetermined period of time with the recognized current viewing state of the user as a starting point; and
    displaying information relating to content predicted to b viewed through the predicted viewing behavior.

11. A non-transitory computer readable storage medium having stored thereon a program for causing a computer to execute a process comprising the steps of:
    acquiring a viewing log including information representing content of an operation for viewing content and time of the operation;
    learning, based on the acquired viewing log, a viewing behavior model which is a stochastic state transition model representing a viewing behavior of a user;
    recognizing, using the viewing behavior model obtained through learning, a current viewing state of the user;
    predicting, using the viewing behavior model, the viewing behavior of the User after a predetermined period time with the recognized current viewing state of the user as a starting point; and
    displaying information relating to content predicted to be viewed through the predicted viewing behavior.

12. An information processing device comprising:
    a memory having stored thereon a plurality of computer-executable units; and
    one or processors configured execute the plurality of units, the plurality of units comprising:

an acquisition unit configured to acquire a viewing log including information representing content of an operation for viewing content and time of the operation;

a learning unit configured to learn, based on the viewing log acquired by the acquisition unit, a viewing behavior model which is a stochastic state transition model representing a viewing behavior of a user;

a recognition unit configured to recognize, using the viewing behavior model obtained through learning by the learning unit, a current viewing state of the user;

a prediction unit configured to predict, using the viewing behavior model, the viewing behavior of the user after a predetermined period of tine with the current viewing state of the user recognized by the recognition unit as a starting point; and a display control unit configured to display information relating to content predicted to be viewed through the viewing behavior predicted by the prediction unit.

* * * * *